US009495704B2

(12) United States Patent  
Fish et al.

(10) Patent No.: US 9,495,704 B2  
(45) Date of Patent: Nov. 15, 2016

(54) SYSTEM AND METHOD FOR MANAGING EDUCATIONAL INSTITUTION BORROWER DEBT

(71) Applicant: United Student Aid Funds, Inc., Indianapolis, IN (US)

(72) Inventors: Kim Marie Fish, Anderson, IN (US); Brian Edwin Allison, Fishers, IN (US); Carole Ann Simpson, San Francisco, IN (US); Anne Marie Fischer, Homer Glen, IL (US)

(73) Assignee: United Student Aid Funds, Inc., Indianapolis, IN (US)

( * ) Notice: Subject to any disclaimer, the term of this patent is extended or adjusted under 35 U.S.C. 154(b) by 83 days.

(21) Appl. No.: 14/216,771

(22) Filed: Mar. 17, 2014

(65) Prior Publication Data

US 2014/0297515 A1 Oct. 2, 2014

Related U.S. Application Data

(60) Provisional application No. 61/789,904, filed on Mar. 15, 2013.

(51) Int. Cl.  
*G06Q 40/00* (2012.01)  
*G06Q 40/02* (2012.01)  
*G06Q 50/20* (2012.01)  
*G06Q 10/06* (2012.01)

(52) U.S. Cl.  
CPC .............. *G06Q 40/00* (2013.01); *G06Q 10/06* (2013.01); *G06Q 40/025* (2013.01); *G06Q 50/2053* (2013.01)

(58) Field of Classification Search  
USPC ..................................................... 705/35, 38  
See application file for complete search history.

(56) References Cited

U.S. PATENT DOCUMENTS

| | | | |
|---|---|---|---|
| 5,436,965 A | 7/1995 | Grossman et al. | |
| 5,930,764 A | 7/1999 | Melchione et al. | |
| 6,332,154 B2 | 12/2001 | Beck et al. | |
| 7,454,383 B2 | 11/2008 | Keyes et al. | |
| 7,647,252 B2 | 1/2010 | Rampell et al. | |
| 7,970,827 B1 | 6/2011 | Cumberbatch et al. | |
| 8,090,613 B2 | 1/2012 | Kalb et al. | |
| 8,300,799 B2 | 10/2012 | Steul | |
| 8,315,904 B2 | 11/2012 | Black et al. | |
| 8,429,190 B2 | 4/2013 | Gutierrez | |
| 2002/0178038 A1* | 11/2002 | Grybas | G06Q 10/10 705/326 |
| 2005/0222931 A1 | 10/2005 | Mamou et al. | |
| 2006/0020539 A1* | 1/2006 | Salter | G06Q 10/00 705/38 |
| 2006/0199164 A1* | 9/2006 | Murray | G06Q 90/00 434/322 |

(Continued)

Primary Examiner — Lalita M Hamilton  
(74) Attorney, Agent, or Firm — Indiano & McConnell LLC

(57) ABSTRACT

A system is disclosed that makes it easy for educational institutions to contact and counsel student loan borrowers to promote successful loan repayment. The system is a web-based tool that automates borrower communication through telephone, letter and email campaigns, using loan information that is obtained through third-party loan servicers by the educational institution and then uploaded into the system. The self-service default prevention tool aggregates loan data form multiple sources in one place to perform borrower outreach, offers targeted communication campaigns to address borrowers in repayment, displays real-time estimated default rate trends, and provides on-demand reports. A dashboard is generated that provides a snapshot of the educational institution's entire portfolio, projected cohort default rates, trending analysis charts, important messages and a history of file imports.

18 Claims, 33 Drawing Sheets

(56) References Cited

U.S. PATENT DOCUMENTS

| | | | |
|---|---|---|---|
| 2006/0265258 A1* | 11/2006 | Powell | G06Q 10/10 705/327 |
| 2008/0027958 A1 | 1/2008 | Kapoor et al. | |
| 2009/0048957 A1* | 2/2009 | Celano | G06Q 40/06 705/35 |
| 2009/0081629 A1* | 3/2009 | Billmyer | G09B 7/02 434/362 |
| 2010/0114685 A1* | 5/2010 | Blass | G06Q 20/10 705/14.16 |
| 2011/0106692 A1 | 5/2011 | Moore et al. | |
| 2011/0264521 A1* | 10/2011 | Straka | G06Q 30/02 705/14.49 |
| 2012/0239437 A1* | 9/2012 | Harris | G06Q 40/02 705/4 |
| 2012/0317015 A1* | 12/2012 | Cohen | G06Q 40/025 705/38 |
| 2013/0290167 A1* | 10/2013 | Laky | G06Q 40/025 705/38 |
| 2014/0258096 A1* | 9/2014 | Haggerty | G06Q 40/025 705/38 |

\* cited by examiner

| | Category | Name | Description | Follow-Up Days | Exclude Days | Status | Date Last Updated | Last Updated By |
|---|---|---|---|---|---|---|---|---|
| Edit Disable | Incoming Call | IBR Form Sent | IBR Form Sent | 5 | | Active | 7/27/2012 2:32:24 PM | K.Shiflette |
| Edit Disable | Other | no answer | went to vm | 3 | | Active | 7/27/2012 2:32:24PM | K.Shiflette |
| Edit Disable | Incoming Call | Payment made | Payment made | | 30 | Active | 7/27/2012 2:32:24PM | K.Shiflette |
| Edit Disable | Incoming Call | Incoming Call | | | | Active | 7/27/2012 2:32:24PM | K.Shiflette |
| Edit Disable | Email | Email Sent | | | | Active | 7/27/2012 2:32:24PM | K.Shiflette |
| Edit Disable | Letter | Letter Sent | | | | Active | 7/27/2012 2:32:24PM | K.Shiflette |
| Edit Disable | Outgoing Call | Outgoing Call | | | | Active | 7/27/2012 2:32:24PM | K.Shiflette |
| Edit Disable | Other | Other | | | | Active | 7/27/2012 2:32:24PM | K.Shiflette |
| Edit Disable | Borrower Walk-In | Borrower Walk-In | | | | Active | 7/27/2012 2:32:24PM | K.Shiflette |
| Edit Disable | Other | Talked to servicer | Talked to servicer | 5 | | Active | 7/27/2012 2:32:24PM | K.Shiflette |

FIG. 14

| | 1902 | 1904 | 1906 | 1810 | 1908 Date Last Generated | 1910 Last Generated By | 1912 Last Completed By | 1914 Date Last Completed |
|---|---|---|---|---|---|---|---|---|
| Generate | View Borrower Lists | Preview Content | Defaulted | 9/26/2012 1:01:23 PM | dthomas | dthomas | 9/26/2012 1:03:20 PM |
| Generate | View Borrower Lists | Preview Content | Deferment | 7/20/2012 11:18:05 AM | K.Shiflette | | |
| Generate | View Borrower Lists | Preview Content | Delinquent 1-30 | | | | |
| Generate | View Borrower Lists | Preview Content | Delinquent 31-60 | 9/26/2012 1:01:29 PM | dthomas | dthomas | 9/26/2012 1:03:28 PM |
| Generate | View Borrower Lists | Preview Content | Delinquent 91-120 | | | | |
| Generate | View Borrower Lists | Preview Content | Forbearance | 9/26/2012 1:01:31 PM | dthomas | dthomas | 9/26/2012 1:03:47 PM |
| | | | | | | dthomas | 9/26/2012 1:02:23 PM |

FIG. 19

| | USA Funds Borrower Connect | | | | | □ X |
|---|---|---|---|---|---|---|
| ← → | https://borrowerconnect-uat.usafunds.org/ | | | ▼ 🔒 ☒ ✜ × | 🔎 Search | ▼ |
| File Edit View Favorites Tools Help | | | | | | |
| ▦ ▼ InterComm Home | USA Funds Borr... × | | | 🏠 ▼ 🔊 ▼ ☐ 🖶 ▼ Page ▼ Safety ▼ Tools ▼ ⑦ ▼ | | |

USAFunds
Borrower Connect  Welcome, Scott Pandorf | Organization: ABC University - UAT - Central Group   🏠 Home ⓘ My Profile 🚪 Logout

| My Home ⊙ | My Files ⊙ | My Borrowers ⊙ | My Campaigns ⊙ | My Reports ⊙ | My Resource Center ⊙ | Administration ⊙ |

Organization Search  Organization Import Log

Search Criteria
Name [_____2502_____]   Organization ID [_____2504_____]   [ Search ]—2506
                                                                   [ Exit Organization ]

| | | Name | OPEID | Address | City | State Province | Zip Postal Code |
|---|---|---|---|---|---|---|---|
| ⟳ | ◀ 1 2 3 4 5 ▶ ▶▌ | | | | | | —2508 |
| View | | ABC University | 567855 | 123 Main St. | Springfield | Indiana | 12545 |
| View | | Alabama State University | 0010500 | 915 S. Jackson St. | Montgomery | Alabama | 30101 |
| View | | American Beauty Academy | GRP0345 | 200 W. 9th St. | Wilmington | Delaware | 19501 |
| View | | Arkansas Baptist College | 001057 | 1621 Martin Luther King Dr. | Little Rock | Arkansas | 72202 |
| View | | Baker College | GRP0280 | 1050 West Bridel Road | Flint | Michigan | 48507 |
| View | | Bradford School | 00485300 | 133 Freeport Rd. | Pittsburgh | Pennsylvania | 15215 |
| View | | Bryan University | 03066200 | 237 S. Morenca Ave. | Springfield | Missouri | 65505 |
| View | | California Baptist | 00112500 | 8432 Magnolia Ave. | Riverside | California | 92504 |
| View | | Career Point College | 025911 | 3700 Fredericksburg Rd. | San Antonio | Texas | 78201 |
| ⟳ | ◀ 1 2 3 4 5 ▶ ▶▌ | | | | | | |

Build 2.1.0.8 | | Terms of Use | System Requirements | Support: (800) 766-0084 | Copyright 2012 United Student Aid Funds, Inc.
Done | | ✓ Trusted sites | Protected Mode: Off  🌐 ▼  ⚡ 100% ▼

SYSTEM AND METHOD FOR MANAGING EDUCATIONAL INSTITUTION BORROWER DEBT

CROSS REFERENCE TO RELATED APPLICATION

The present application claim priority to and the benefit of U.S. Provisional Application No. 61/789,904, filed Mar. 15, 2013, entitled System and Method for Managing Educational Institution Borrower Debt.

BACKGROUND

Educational institutions must consistently monitor student loan data to determine how many of the school's borrowers who enter repayment on school loans during a fiscal year default prior to the end of the next two to three fiscal years. The cohort default rate ("CDR") is what educational institutions use to define this statistic and it is based on the percentage of borrowers who are in default. Currently, the Department of Education ("DOE") monitors the CDR by looking at the first two years of repayment. Recently, congress passed the Higher Education Opportunity Act ("HEOA") to change this to a three-year CDR. As of fiscal year 2014, the DOE will only determine the CDR based on the percentage of borrowers who enter default within this three-year period. If the CDR for a particular educational institution reaches a certain threshold level, the DOE can impose penalties on the educational institution. In some instances, this could mean the loss of the educational institution's ability to make federal student loans available to students, which could have a major impact on the ongoing viability of the educational institution. Educational institutions also have a desire to keep borrowers current on private loans as well as loans funded by the federal government.

Thus, a need exists for a system and method of, amongst other things, monitoring and tracking the projected CDR of a school's student borrowers, to keep borrowing data current, and to create campaigns specifically targeted to borrowers who are entering repayment, are delinquent and/or at a high risk of defaulting to ensure that they get current on payments or remain in good standing. Although schools do not typically collect payments from student loan borrowers, schools have an interest in counseling their students and former students about which entities are servicing their student loans, repayment options that may be available, and any other assistance that a school can provide to prevent them from defaulting.

BRIEF DESCRIPTION OF THE DRAWINGS

FIG. 6 shows a representative example of a manage organization page.
FIG. 8 shows a representative example of a create campaign group list page.
FIG. 10 shows a representative example of a create campus list page.
FIG. 14 shows a representative example of a communication code page.
FIG. 17a shows search results from the find my borrower page.
FIG. 17b shows a borrower details page illustrating a loan summary.
FIG. 17c shows a pop-up window generated to display loan details.
FIG. 17d shows a borrower details page illustrating a communication history.
FIG. 17e shows a record communication with borrower window.
FIG. 18a shows a representative example of a new campaign configuration page.
FIG. 18b shows a representative example of a new phone campaign configuration page.
FIG. 18c shows a representative example of a new email campaign configuration.
FIG. 19 shows a representative example of a generate campaign page.
FIG. 25 shows a representative example of an organization search page.
FIG. 28 shows a representative example of an organization type page.

DETAILED DESCRIPTION OF THE ILLUSTRATIVE EMBODIMENTS

Figure 1:
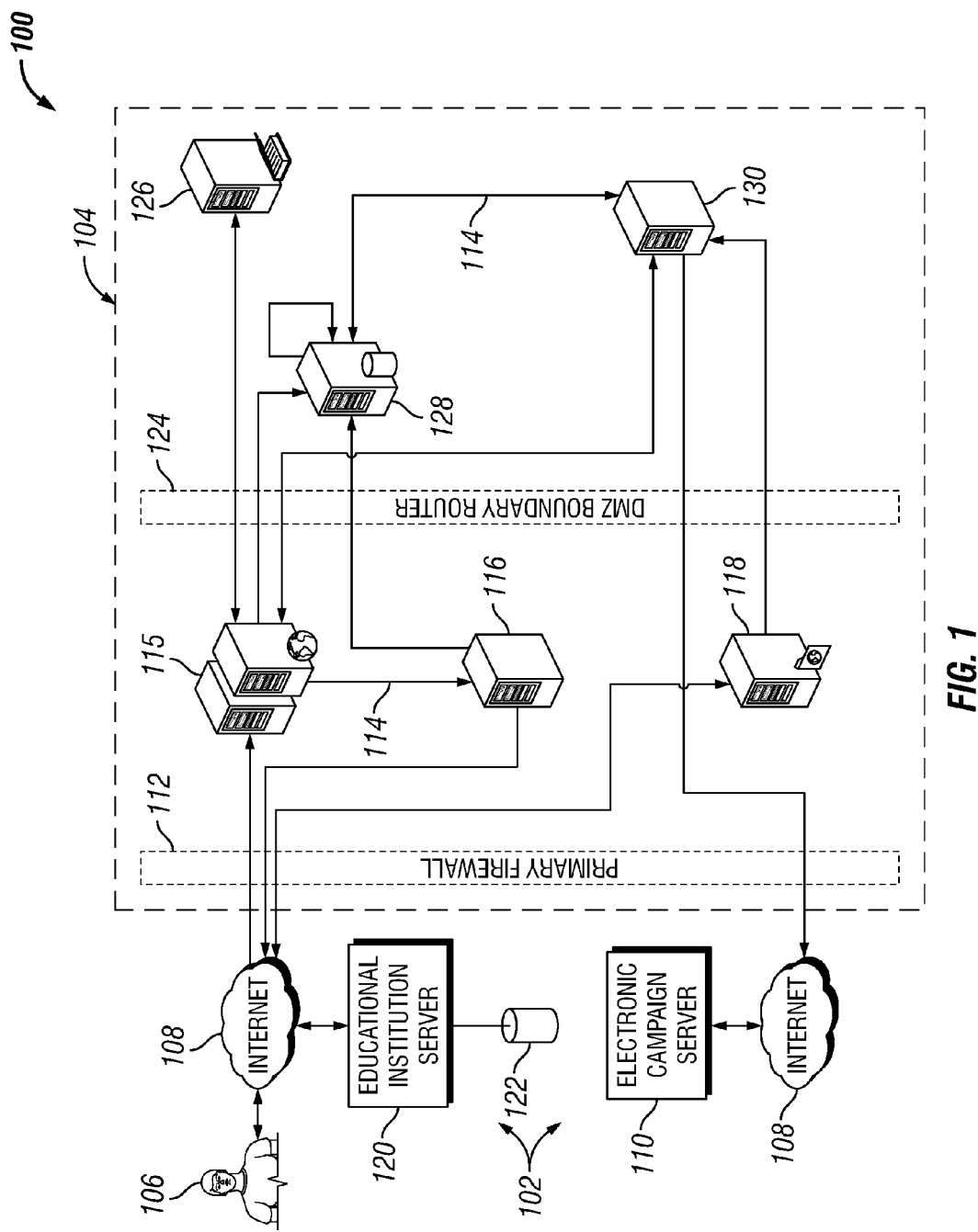
FIG. 1 discloses a borrower connect system.

Referring to FIG. 1, a borrower connect system 100 is disclosed that assists educational institutions/organizations improve their CDRs/default rates by connecting with borrowers through communication devices (e.g., mobile phones, telephones, etc.), text messages, letters, and emails (collectively "communication methods"). In one form, the borrower connect system 100 is operable to help educational institutions create contact campaigns that are targeted to student borrowers that utilize the communication methods set forth above. Using loan information that is uploaded by the educational institution from various loan servicers (private and government), guarantors, and the National Student Loan Data System ("NSLDS"), the borrower connect system 100 helps the educational institution perform borrower outreach regardless of the loan program. The NSLDS is the national database of information about student loans and grants awarded to students under Title IV of the Higher Education Act ("HEA") of 1965. NSLDS provides a centralized, integrated view of Title IV loans and grants during their complete life cycle, from aid approval through disbursement, repayment, deferment, delinquency, and closure.

The borrower connect system 100 allows the educational institution, preferably through a web browser based user interface provided over the Internet, to 1) create borrower communication campaigns that can be targeted to address borrowers at various stages of repayment; 2) view real-time projected and actual CDR trends to address borrowers who need immediate attention; 3) accommodate Federal Family Education Loan Program, Direct Loan, and "put" loan data to address both two-year and three-year CDRs; and 4) generate on-demand reports to capture borrower loan details, delinquency aging statistics, campaign and portfolio information, and view reports online via a web browser based interface or export them as a Microsoft® Excel, XML or CSV file. In other forms, various other file formats could be used to export data concerning borrowers.

The borrower connect system 100 is a self-service tool that makes it easy to contact and counsel student loan borrowers to promote successful loan repayment. The system 100 comprises a web-based tool that educational institutions can use to automate borrower communication through telephone, letter and email campaigns, using loan information that the educational institution uploads from various third-party loan servicers and NSLDS. The borrower connect system 100 is a default prevention tool that aggregates loan data from multiple sources in one place to allow the educational institution to perform borrower outreach regardless of loan program. It offers targeted communication campaigns to address borrowers at any stage of repayment. It displays real-time estimated default rate trends so that educational institutions can pinpoint borrowers who need immediate attention. Further, it provides on-demand reports to capture cohort default rate, effectiveness, trending and analytics.

In one form, the borrower connect system 100 includes an external system 102 and an internal system 104. The external system 102 includes a borrower connect end user terminal or device 106 that allows the end user to access the internal system 104. In one form, the borrower connect end user device 106 comprises any type of computing device that includes web browser software that allows the user to access the internal system 104 such as, for example, Internet Explorer®, Mozilla Firefox, Google Chrome, and so forth. The borrower connect end user device 106 allows users at educational institutions to access the internal system 104 and portions of its functionality as set forth in greater detail below. In other forms, the end user device 106 allows internal users to access the borrower connect system 100.

The end user device 106 thus includes a web browser that allows the user to access the internal system 104 via a web-based user interface. The end user device 106 may comprise, to name a few, a desktop computer, a laptop computer, a mobile device, a smart-phone, a tablet, and so forth. In one form, the end user device 106 accesses the internal system 104 via an Internet-based network 108 that uses the IP protocol to send and receive data. It should be appreciated that other types of networks may be utilized to provide the end user device 106 with access to the internal system 104.

As further illustrated in FIG. 1, the external system 102 of the borrower connect system 100 may include an electronic campaign server 110 that is connected to the internal system 104 via an Internet-based network 108. As described in greater detail below, the electronic campaign server 110 may be responsible for generating letters, emails, electronic automated calls, and text messages that are targeted to borrowers that are either delinquent or default on repayment of one or more student loans or are at a high risk of becoming delinquent or defaulting with respect to the repayment of one or more student loans. The communication methods used to communicate with borrowers may be collectively referred to as communication campaigns. Measures are taken by the borrower connect system 100 to ensure that the campaign messages that are sent to the borrower are private in nature and not made generally available to the public, friends, or relatives of the borrower. In one form, the electronic campaign server 110 and applications and processes associated therewith are provided by ExactTarget®. In yet another form, the communication campaigns can be accessed by an external user 106 using a web-browser that is configured to allow the user to set up communication campaigns.

In other forms, the electronic campaign server 110 could be part of the internal system 104 and operated by the owner of the borrower connect system 100 or the software used to generate communication campaigns could be located on servers located in the internal system 104 such as the file and processing server 130. The external system 102 and its related hardware components and software applications may be referred to herein as the Tier 1 level of the borrower connect system 100.

The internal system 104 may include a primary firewall 112 to secure the internal system 104 from unwanted traffic and attacks. The primary firewall 112 can be either software-based or hardware-based or a combination of both. In one form, the primary firewall 112 controls incoming and outgoing network traffic by analyzing the data packets and determining whether the data packets should be allowed through or not based on a predetermined set of rules. The primary firewall 112 of the internal system 104 creates a bridge between the internal network defined by the internal system 104 and another network (e.g., Internet-based network 108) to which the internal system 104 is connected that is assumed not to be secure and/or trusted.

The lines illustrated in FIG. 1 that interconnect the various hardware components of the internal system 104 disclose an internal network 114 that allows the hardware devices or servers to communicate with one another. In one form, the internal network 114 can comprise a LAN, WAN, WLAN, SAN or a combination of one or more of these types of networks in addition to other network types. Although various hardware devices or servers are illustrated in FIG. 1, it should be appreciated that multiple hardware devices or servers could be used with respect to each hardware device or server disclosed in FIG. 1. In illustrative embodiments in which multiple hardware devices or servers are utilized, the internal system 104 of the borrower connect system 100 is configured to route the tasks to be performed by the respective hardware device or server to the least loaded hardware device or server. It should also be appreciated that in smaller scaled versions of the borrower connect system 100, the internal system 104 may comprise a single hardware device or server. The borrower connect system 100 is designed to be readily scalable to handle increasing system loads.

The internal system 104 includes one or more web servers 115. As known to those skilled in the art, web servers 115 refer to software and/or hardware that delivers Web content that can be accessed through the Internet-based network 108. As it relates to the present invention, the web servers 115 are configured to deliver web pages in response to requests from the end user devices 106. In one form, web pages are delivered to the end user devices 106 over the Internet-based network 108 using the Hypertext Transfer Protocol ("HTTP"). As set forth in greater detail below, the web servers 115 are configured to deliver HTML documents and any additional content that may be included in a document, such as images, style sheets and scripts. It should also be appreciated that end user devices 106 may also include devices that are used to access the system 100 by internal users of the system 100 as opposed to external users at educational institutions. These devices 106 may connect to the system 100 via the Internet-based network 108 or the internal network 114.

In one form, the web servers 115 are configured to deliver content to the web browser on the end user device 106 via the HTML application framework. HTML is an application framework for writing and running rich Internet applications. At initial login, the web server 115 compares the existing version of HTML on the end user device 115 to the current version being used by the web server 115. If it is different, the web server 115 causes the end user device 106 to download and execute the latest version. If HTML is not installed, the web server 115 causes the latest version to be uploaded and executed by the end user device 106. This is all done in the context of the web browser installed on the end user device 106. In other forms, the web servers 115 are configured to deliver content using HTML5 and any further add-ons thereto.

The applications and features of the borrower connect system 100 discussed below that are delivered to and executed by the end user devices 106 may be developed using Microsoft's ASP.NET Web application framework. This framework allows programmers to build dynamic web sites, web applications, and web services. ASP.NET is built on the Common Language Runtime ("CLR"), allowing programmers to write ASP.NET code using any supported .NET language. In yet another form, the Windows Communication Foundation ("WCF") is also utilized to provide some of the applications to the end user devices 106. Other frameworks, languages, and applications can be used in other forms of the invention and those listed above should be viewed as illustrative unless otherwise specifically claimed in the claims set forth below.

The internal system 104 may also include a SQL server reporting services ("SSRS") server 116. The SSRS server 116 includes a server-based report generation software application. The server-based report generation software application is operable to deliver a variety of interactive and printed reports, which may be in the form of preformatted letters. Reports and letters are typically defined in the Report Definition Language ("RDL"), which is an XML markup language. Reports and letters defined by RDL can be generated in a variety of formats including Excel, PDF, CSV, XML, and TIFF (and other image formats). The server-based report generation software application can also prepare reports and letters in Microsoft Word format ("DOC" or "DOCX") or other word processing formats.

The internal system 104 may also include a secure file transfer server or File Transfer Protocol ("FTP") server 118. In one form, the secure file transfer server 118 uses the FTP to transfer files from one host to another host over a TCP-based network, such as the Internet-based network 108. Other file transfer protocols may be used to transfer files in other embodiments of the present invention. The FTP server 118 functions as a secure landing zone for imported files from educational institutions, such as files received from educational institution server 120 or from the end user device 106. The web servers 115, SSRS server 116, and secure file transfer server 118 may be collectively referred to hereinafter as the Tier 2 level.

In one form and as set forth in greater detail below, a user of terminal 106 associated with an educational institution may access a web page interface generated by the web servers 115 to import loan data files into the borrower connect system 100. In this form, the loan data files are imported via the web based interface to the secure FTP server 118. The educational institution server 120 may include a borrower database 122 or have access or be connected with a borrower database 122 that contains data related to borrowers such as, for example, the borrower's name, address, telephone numbers (e.g., home, mobile, work), email addresses (e.g., work or personal), social security number, date of birth, one or more loan records, original loan amounts or disbursements, current loan balances, loan repayment schedules, repayment status (e.g., deferment, repayment, delinquent (1-30 days, 31-60 days, 61-90 days, 91-120 days, 121-180 days, 181-270 days, 271-360+ days), forbearance, grace all, grace graduated, grace less than half time, grace withdrawn, grace other and defaulted), payoff data, and closure data (collectively referred to herein as "borrower loan data"). As such, the FTP server 118 is configured to securely import borrower loan data files that contain borrower loan data associated with one or more borrowers that are associated with the educational institution. The borrower loan data files may also be stored locally on the end user device 106 and uploaded directly from the end user device 106. The borrower loan data files are obtained by the schools from various student loan servicers in various file formats as set forth below. The borrower loan data files may also be obtained by the schools through the NSLDS.

Referring to FIG. 1, the internal system 104 of the borrower connect system 100 may also include several components that are internally separated from the Tier 2 level. In this form, a DMZ boundary router 124 separates the Tier 2 level from a domain server 126, a database server 128, and a file and processing server 130, which may be collectively referred to herein as the Tier 3 level. The DMZ boundary router 124 provides an additional layer of security for the Tier 3 level. The hosts most vulnerable to attack are those that provide services to users outside of the internal network 114. In this case, the Tier 2 level represents hosts that provide services to users outside of the internal network 114. As such, an external attacker who is able to penetrate the primary firewall 112 would have to penetrate an additional layer of security to gain access to the devices and information or data contained in the Tier 3 level.

The domain server 126 is responsible for validating users, both internal and external, of the borrower connect system 100. External users are validated through a SQL membership provider that operates under the same principles as the domain server 126.

As set forth in greater detail below, the database server 128 includes software applications that provide database services to the various software applications utilized by the borrower connect system 100. The database server 128 also includes one or more databases that store various data files such as the loan data files imported to the system 100. The database services provided by the database server 128 allow users to enter, edit, modify, delete and perform various other database related tasks and functions.

The file and processing server 130 is responsible for converting the borrower loan data files imported by the FTP server 118 into a format that is usable by the borrower connect system 100. Once the data conversion process is complete, the borrower loan data is uploaded or imported into a primary borrower connect database stored on the database server 128. During the import process, the individual data types contained in the loan database files are mapped to a borrower connect database table. Records contained in the table can then be selected to calculate the 3-year CDR that is then used to manage borrower loan records and contact campaigns. As set forth in detail below, the data is made available to the educational institutions via a web-browser based user interface through a secure network connection.

Figure 2:
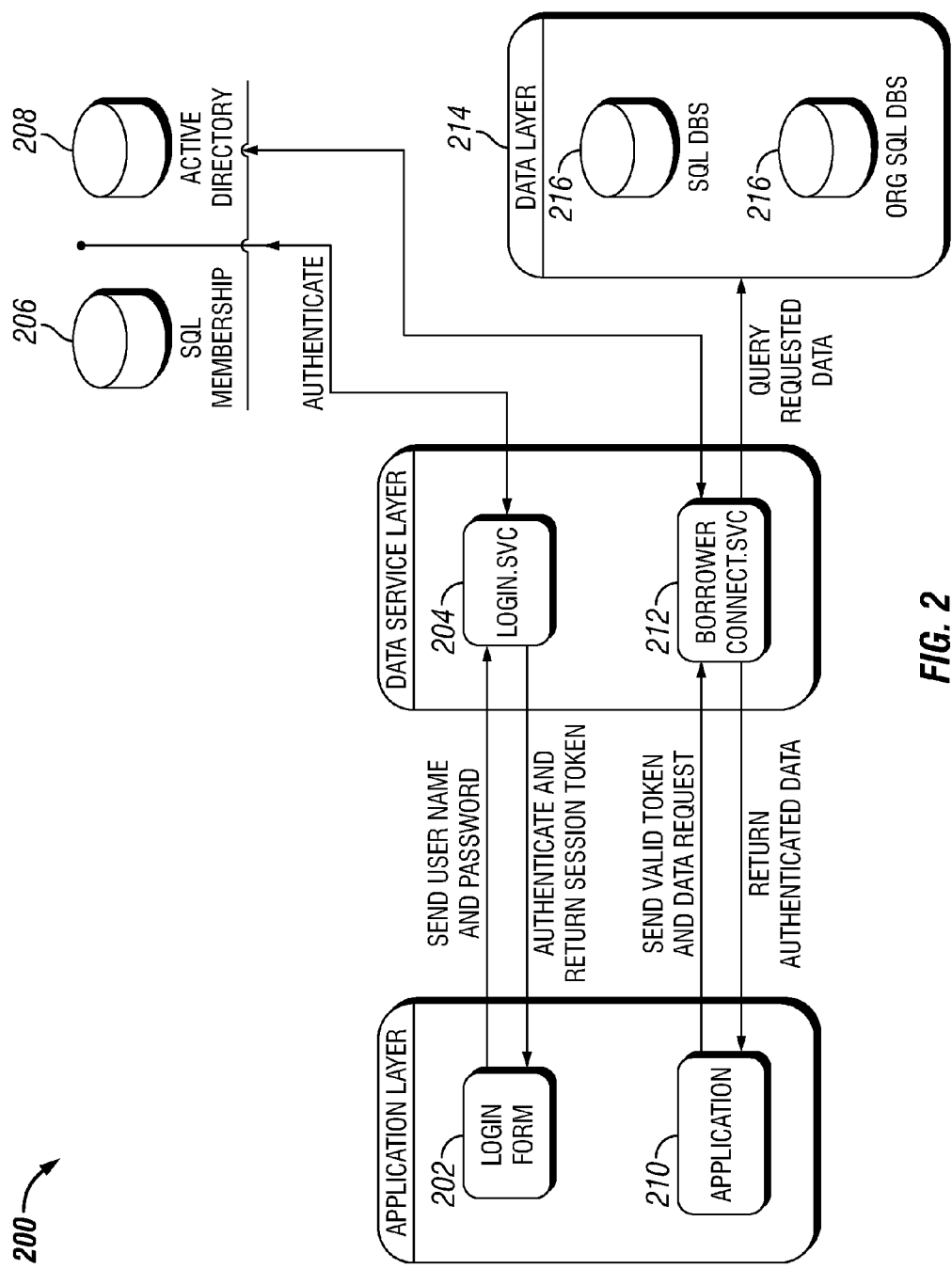
FIG. 2 discloses a security flow of the borrower connect system.

Referring to FIG. 2, the borrower connect system 100 includes sensitive information in the form of borrower data that should not be exposed to individuals not authorized to access the system 100. The borrower connect system 100 supports two classes of users, internal users and external users. Internal users are employees of a company that manages and supports the borrower connect system 100. Internal users are authenticated via the domain server 126 and the borrower connect system 100, which provides for a two level authentication process (i.e., an internal user must be valid and enabled) by the domain server 126 and also exist in an internal user database maintained on the database server 128. External users 106 are authenticated via the borrower connect system 100. Each user has a user ID that is used to access functionality within the borrower connect application, access to external resources (such as saving import files to disk or updating information in the database server 128), and uses a specific domain ID that has been created for the borrower connect application and only grants access to the minimal set of resources necessary for the application.

Figure 3:
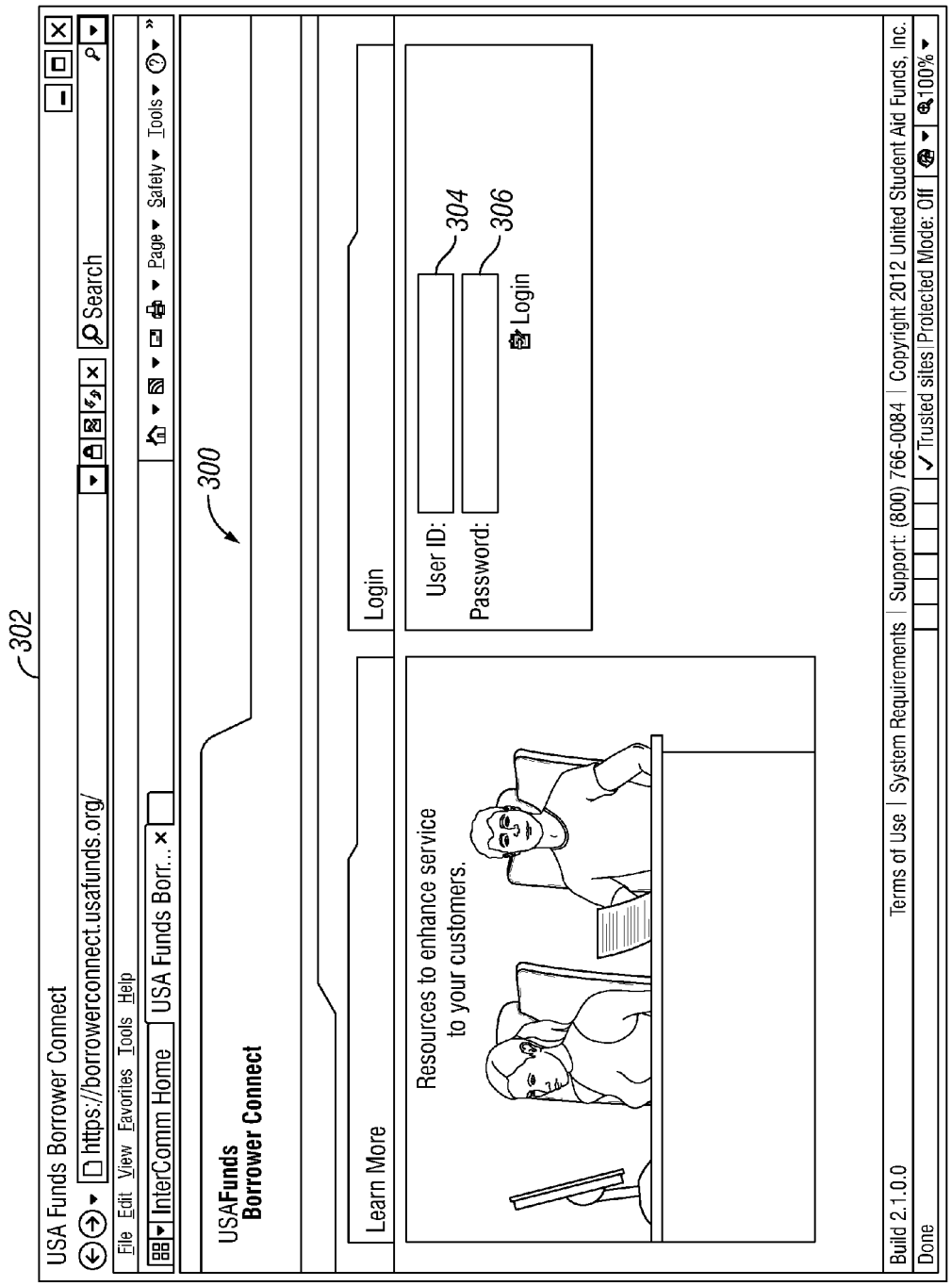
FIG. 3 shows a representative example of a login page.

A security application 200 is set forth in FIG. 2 that allows internal and external users to gain access to the borrower connect system 100. Referring to FIGS. 2 and 3, the security application 200 includes a login application 202 that is operable to generate a login browser page 300 on a web browser 302. The login browser page 300 includes a user identification entry field 304 and a password entry field 306. Once these items are entered by the user, the user selects a login icon 308 that causes the login browser page 300 to transmit these entries to a borrower connect login application 204. The borrower connect login application 204 then is operable to authenticate the user by accessing a membership database 206 (in the case of external users) and an active directory 208 (in the case of internal users) that may be located on the domain server 126 to determine what applications and data of the borrower connect system 100 to which the user has access.

The membership database 206 and active directory 208 is used to determine the set of resources that are necessary for the user to have access to in order to use the borrower connect application. Each user is assigned an access level that is identified in the membership database 206 or active directory 208 that grants access to certain applications and data provided by the borrower connect application. After the determination is made as to what level of access the user is entitled, the borrower connect login application 204 authenticates that user by generating a session token that is sent to the terminal 106 that the user is utilizing to access the borrower connect application. The session token is a unique identifier that is sent to the user's terminal 106 to identify the current interaction session. The user's terminal stores and sends the session token as a cookie and/or sends it as a parameter in queries or data requests to the system 100.

As further illustrated in FIG. 2, after being authenticated and receiving the session token, the user is ready to access the borrower connect application 210. As set forth in detail below, the user preferentially accesses the borrower connect application 210 via a web browser based user interface by sending data requests to the web server 115. As set forth above, in some embodiments, the internal system 104 of the borrower connect system 100 may be located on one or more servers and as such, unless the claims set forth otherwise, it should be appreciated that the internal system 104 can be located on one or more servers. For example, one server could act as both the web server, the database server, and the domain server.

The borrower connect application 210 can include an application layer 212 and a data services layer 214. In one form, the application layer 212 is provided to end users via the web servers 115. The data services layer 214 provides users with access to the databases 216 stored on the database server 128.

Figure 4:
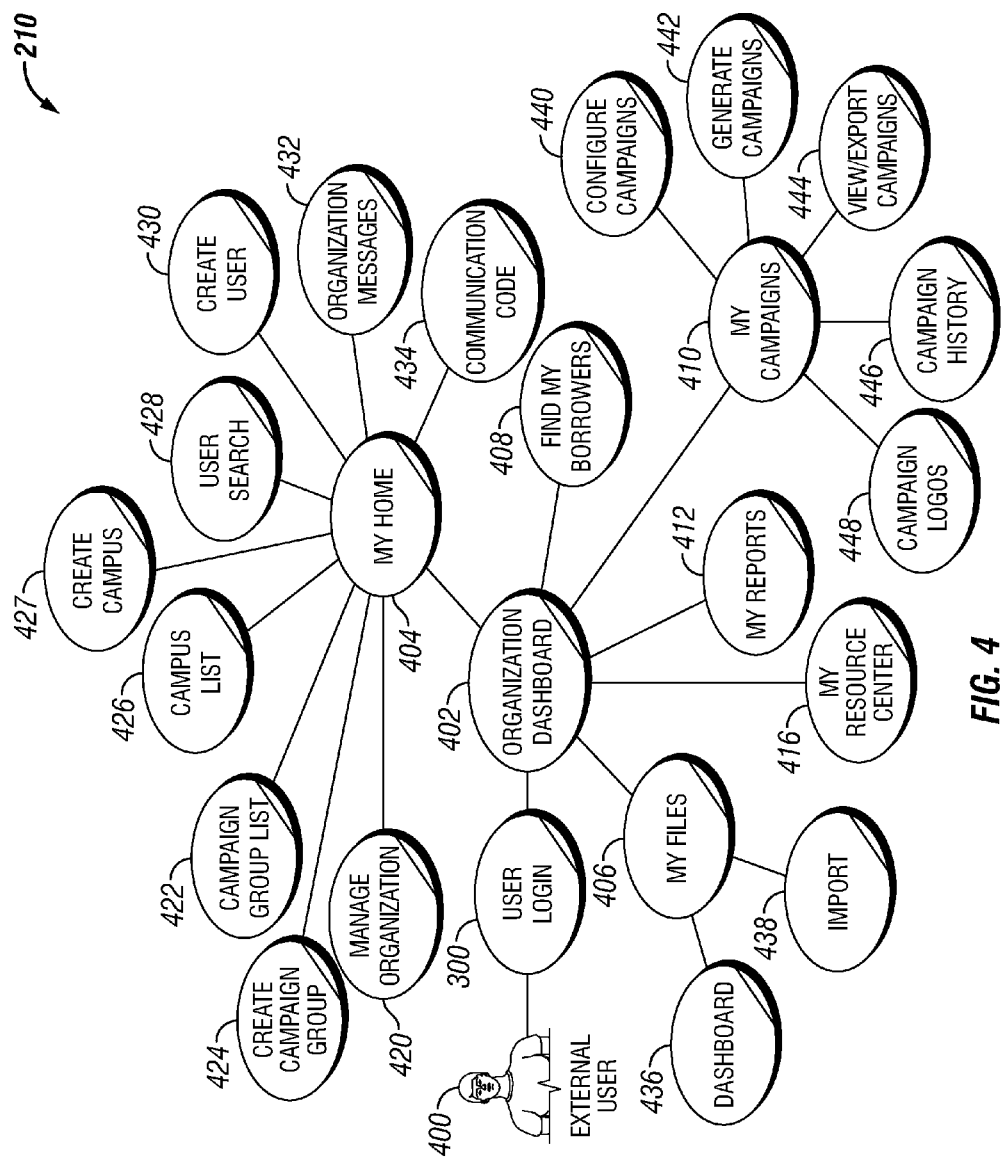
FIG. 4 discloses a flow chart of software applications available to external users of the borrower connect system.
Figure 5:
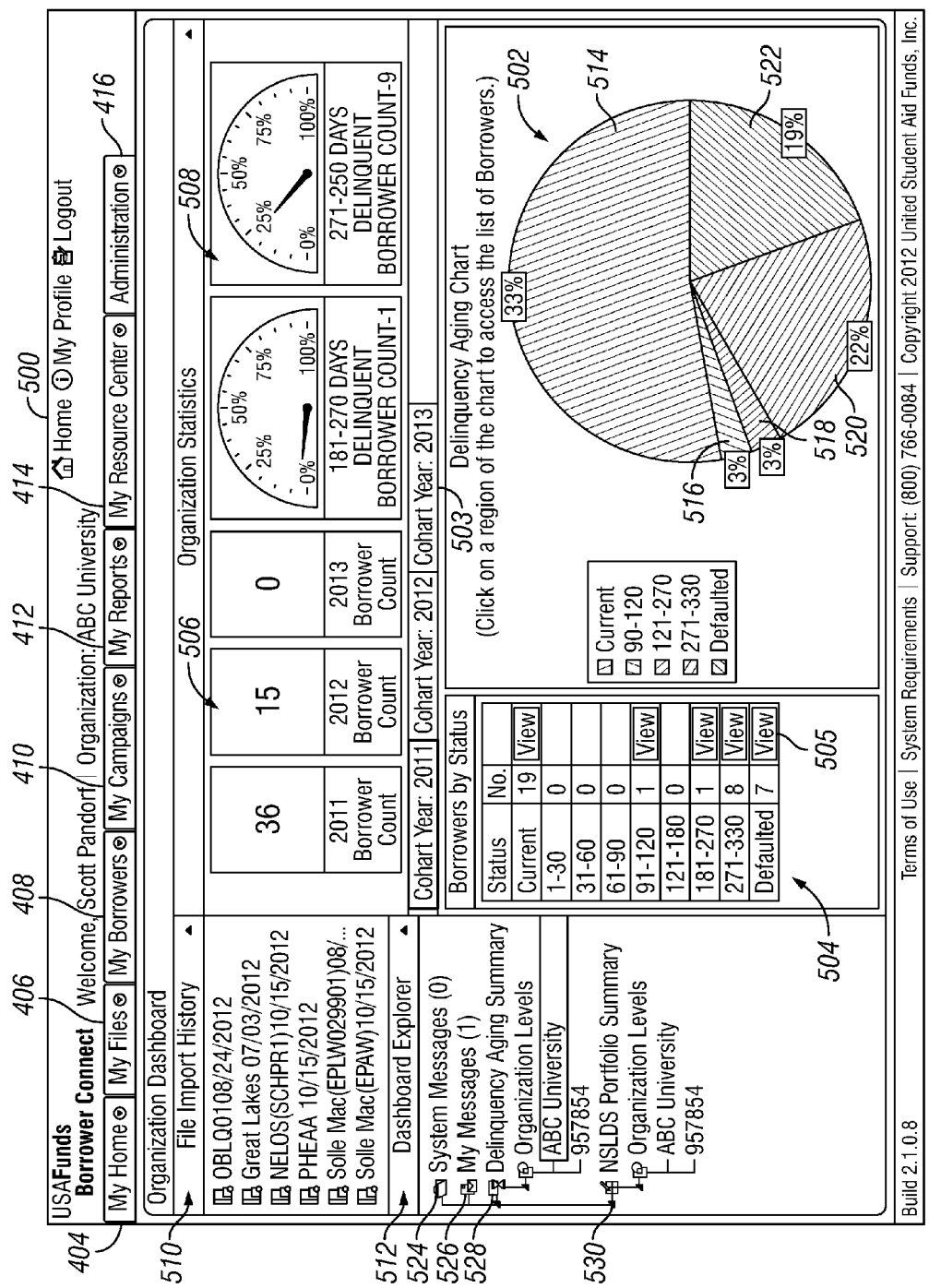
FIG. 5 shows a representative example of an organizational dashboard page.

Referring to FIG. 4, external users 400 of the system 100 may be provided access to various functionality provided by the system 100. After being presented with the login browser page 300, the borrower connect application 210 uses an organization dashboard application 402 that is operable to generate an organization dashboard page 500, which is illustrated in FIG. 5. In one form, all of the pages disclosed herein are generated in a web browser. It should also be appreciated that the borrower connect application 210 could be a stand-alone software application. The organization dashboard page 500 provides a snapshot of the educational institution's entire portfolio, projected cohort default rates, trending analysis charts, important messages and a history of file imports.

The organization dashboard application 402 accesses database server 128 to generate data outputs that are relevant to the university associated with the external user 400. In the illustrated form, the organization dashboard page 500 includes a delinquency aging chart 502 (default view), a borrower by status table 504, a borrower portfolio count for active cohort years display 506, a percentage delinquent display 508 (based on the cohort year highlighted in 503), a file import history display 510, and a dashboard explorer display 512. Selecting a cohort year selection item 503 will cause the dashboard to automatically update to borrower loan data for the selected year. As set forth below in the discussion on the file import application, the organization dashboard page 500 gives the educational institution a collective snapshot of all borrower loan data associated with the educational institution from multiple loan service providers and data sources thereby aggregating borrower data from multiple sources into a single location.

The delinquency aging chart 502 is broken up into at least nine categories based on data obtained from the database server 128. In the illustrated form, the delinquency aging chart 502 is a pie chart, but it should be appreciated that other types of charts could be generated and used as well. The first category is a current category 514, the second category is 91-120 days delinquent category 516 (additional categories did not display due to lack of borrowers in these categories: 1-30 days delinquent category; 31-60 days delinquent category; and 61-90 days delinquent category), the third category is a 121-270 days delinquent category 518, the fourth category is a 271-360 days delinquent category 520, and the fifth category is a defaulted category 522. As such, the delinquency aging chart 502 provides the external user 400 with a quick and simple view of the percentage of borrowers that are current in payment, delinquent in payment from a range of a number of days standpoint, and borrowers in a state of default.

A plurality of cohort year selection items 503 are provided that allow the user to switch to different cohort years as well thereby automatically updating the delinquency aging chart 502 for the cohort year selected, the borrower status table 504, and the percentage delinquent display 508. Once a borrower enters into default status, that defaulted borrower counts as part of the numerator in calculating the institution's portfolio total. Schools with student loan defaults by borrower that exceed 30 percent of the school's total portfolio will be required to create a default management plan. Schools that exceed 30 percent for three consecutive years or 45 percent in a single year lose eligibility for student attending that school to obtain Title IV student loans. All of the data displayed in the various charts and tables disclosed herein allow the educational institution to project the number of student borrowers who may be at risk of entering into default thereby counting against the educational institution. It counts against an educational institution's cohort default rate even if a borrower is current on three loans and in default on one loan. As such, it is important for educational institutions to be able to see trends in data by monitoring the number of borrowers who are at various stages toward entering a default status.

The borrower status table 504 lists the actual number of borrowers that are current, the number of borrowers that are delinquent for certain ranges of time, and the number of borrowers that are defaulted. In this illustrative form, the periods of time for delinquent borrowers is broken down from 1-30 days, 31-60 days, 61-90 days, 91-120 days, 121-180 days, 181-270 days, and 271-359 days and defaulted. It should be appreciated that other time frames could be used in other forms. Various types of tables could be used and the term table should be construed broadly to include standard tables, bar graph tables, and so forth. In addition, a view selection item 505 is provided that when selected, causes the organization dashboard application 402 to generate a report that shows each borrower's information that falls within a particular category. The yearly borrower display 506 lists the total number of borrowers (cohort base denominator) associated with the university for a set of active cohort years. In this form, the number of borrowers in each of the active three cohort years is listed individually.

The percentage delinquent display 508 lists the percentage of borrowers delinquent, for the active cohort year selected in 503, over given time periods. In this form, the percentage of delinquent borrowers is listed in a gauge format and includes two gauge displays and also lists the number of delinquent borrowers. The first gauge lists the number and percentage of delinquent borrowers between 181-270 days and the second gauge lists the number and percentage of delinquent borrowers between 271-359 days. It should be appreciated that other ranges of days could be used in other forms and that other displays could be used other than gauges (e.g.—graphs, numbers, and so forth). The organization dashboard application 402 is also operable to generate a file import history display 510. As set forth in greater detail below, the system 100 is operable to import records about borrowers from various resources or loan servicers. The file import history display 510 informs the user of the dates in which borrower loan data files were last collected or imported from these loan data resources (loan service providers and NSLDS).

The dashboard explorer display 512 contains links to various features. In one form, the dashboard explorer display 512 includes a link to a System Messages view 524 and a link to a My Messages view 526. The System Messages view 524 is an area in which information or messages about the system 100, posted by an internal user, are placed to be viewed by all internal and external users. The My Messages view 526 allows individuals associated with an educational institution to view messages or information posted by the educational institution. A Delinquency Aging Summary link 528 is included that allows external users associated with a respective organization to toggle the dashboard view by different school organization levels, for example, an institutional level or an individual campus level. As a user selects respective links displayed in the Delinquency Aging Summary link 528, the organization dashboard application 402 will update the dashboard to display the selected institution's or campus's data in 502, 504, 506, and 508 (based on the cohort year selected in 503). A Portfolio Summary link 530 is included that allows an organization's borrower loan data to be viewed by loan status in the delinquency aging chart 502 and borrower status table 504 (based on the cohort year selected in 503), by institution or campus level for that organization.

Referring to FIGS. 4 and 5, the organization dashboard page 500 also includes links to a My Home application 404, a My Files application 406, a Find My Borrowers application 408, a My Campaigns application, 410, a My Reports application 412, a My Resource Center application 414, and an Administration application 416. Although not specifically illustrated, selection of the link to the My Home application 404 causes the borrower connect application 210 to generate a menu in the web browser that provides links to the organization dashboard application 402, a manage organization application 420, a campaign group list application 422, a create campaign group application 424, a campus list application 426, a create campus application 427, a user search application 428, a create user application 430, an organization message application 432, and a communication code application 434. See FIG. 4. Each of these respective applications will be discussed in further detail below.

Figure 6:
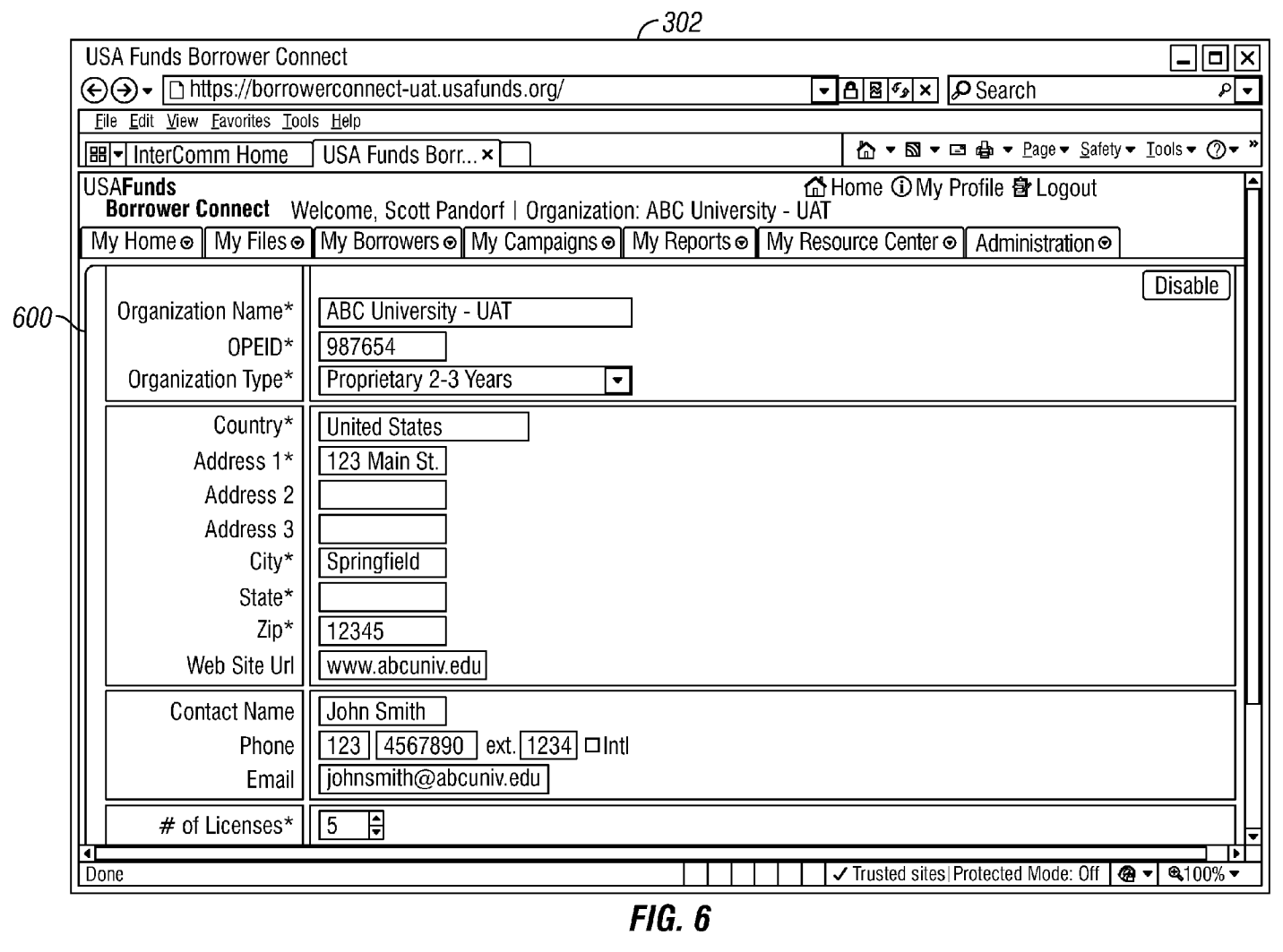

Referring to FIG. 6, selection of the manage organization application 420 generates a manage organization page 600 in the web browser 302. As illustrated, the manage organization page 600 contains various types of data about the organization that can be updated from time to time as necessary. As illustrated, the data may include the name of the organization, Office of Postsecondary Education Identifier (OPEID), address, contact information, and number of licensed users the organization has paid for to access the system 100. A disable selection item 602 is also included that provides the ability to disable the organization from the system 100. Other types of data may be entered about the organization as well.

Figure 7:
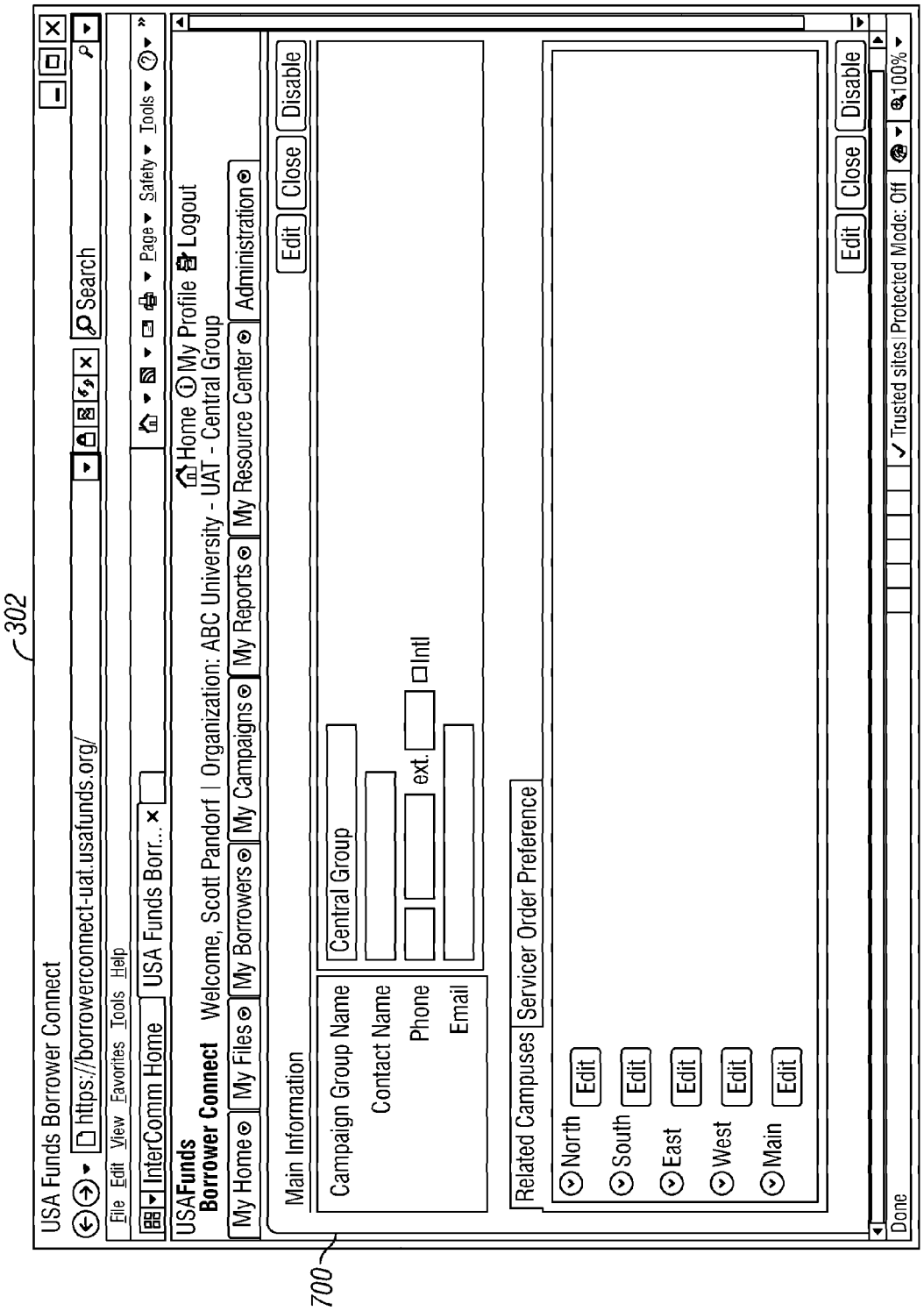
FIG. 7 shows a representative example of a campaign group list page.

Referring to FIG. 7, selection of the campaign group list application 422 generates a campaign group list page 700 in the web browser 302. The campaign group list page 700 contains various types of data about a campaign group list that can be updated from time to time as necessary. As illustrated, the data may include the name of the campaign group, contact information, associated campuses related to the campaign group, and a sort option for servicer applied information. Selecting the edit selection item 702 allows the user to edit information contained in the campaign group list page 700. Selecting the enable/disable selection item 704 will temporarily disable a campaign group.

Figure 8:
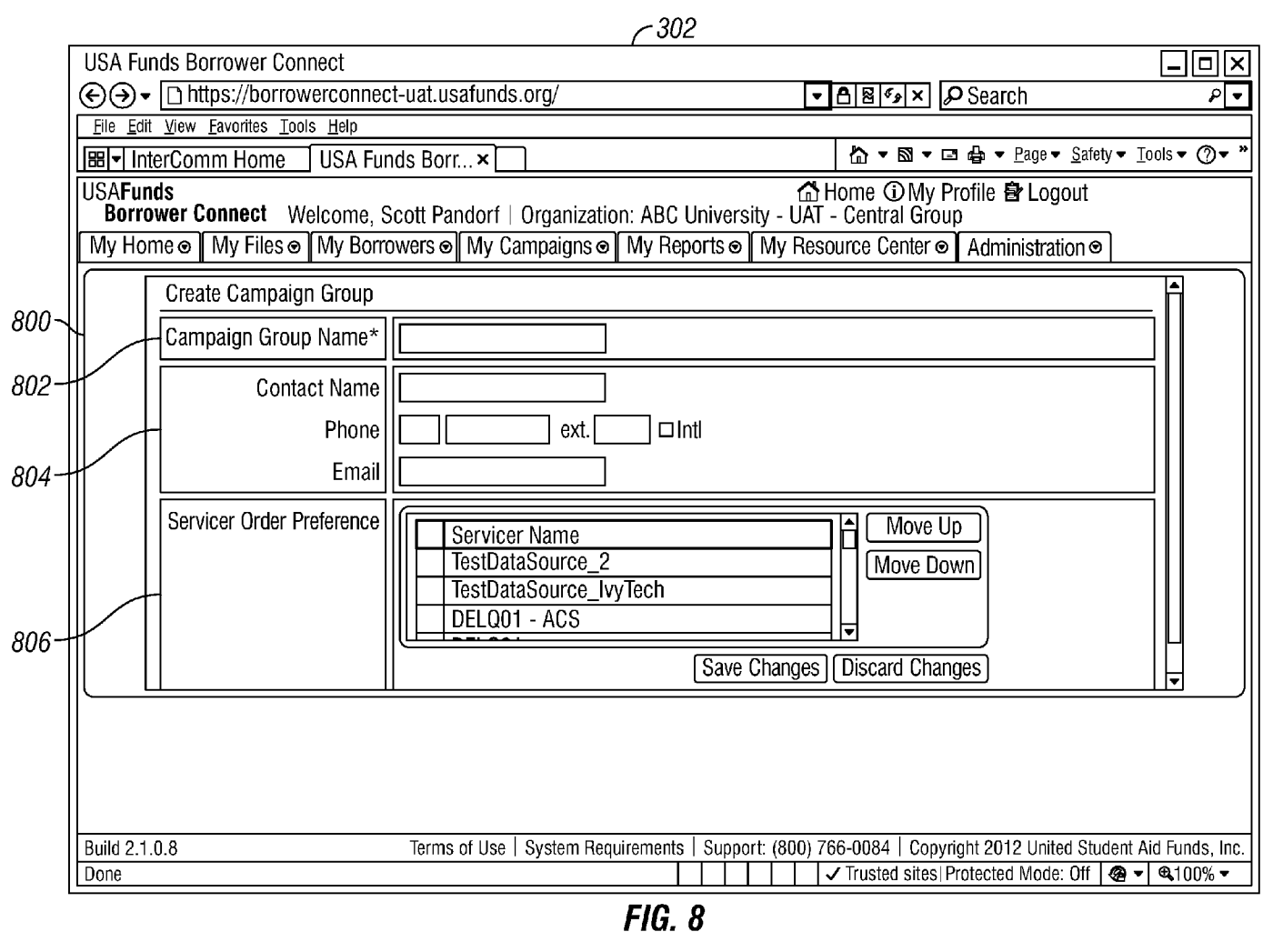

Referring to FIG. 8, selection of the create campaign group application 424 generates a create campaign group page 800 in the web browser 302. Several educational institutions have campuses located in various locations and the campaign group page 800 provides the user 400 with the ability to group campuses together in different campaign groups to centralize work efforts for each campus that is entered in the borrower connect application 210. For example, if an educational institution has campuses located in different states and several campuses within each state, the user 400 may create a campaign group for each state (e.g.—Indiana, Ohio, and so forth). The create campaign group page 800 includes a Campaign Group Name entry field 802, a plurality of contact entry fields 804, and a Servicer Order Preference field 806. The user 400 can create a campaign group name by entering it into the Campaign Group Name entry field 802. A contact can be assigned to the campaign group and their relevant contact information is entered into the plurality of contact entry fields 804.

The Servicer Order Preference field 806 allows the user 400 to determine a servicer (entity that services student loans) preference for collecting primary contact data, such that certain servicers have a higher preference than others based on their ability to provide valid contact data. To set preference orders, the user selects a loan servicer selection item 808 and then either selects a move up selection item 810 or a move down selection item 812. Since the university will be loading borrower data files from multiple loan servicers and each loan servicer will have its own unique set of contact information for borrowers (e.g.—address, phone number, and email address), the university can prioritize which contact information for borrowers takes priority over others. For example, if a servicer is ranked higher than another servicer, yet both have contact information for the same borrower, the borrower connect application 210 is configured to use the contact information for the borrower from the servicer that has a higher ranking instead of the contact information for the borrower from a servicer having a lower ranking Selection of a save changes selection item 814 will save the information entered into the create campaign group page 800 to the database 128.

Figure 9:
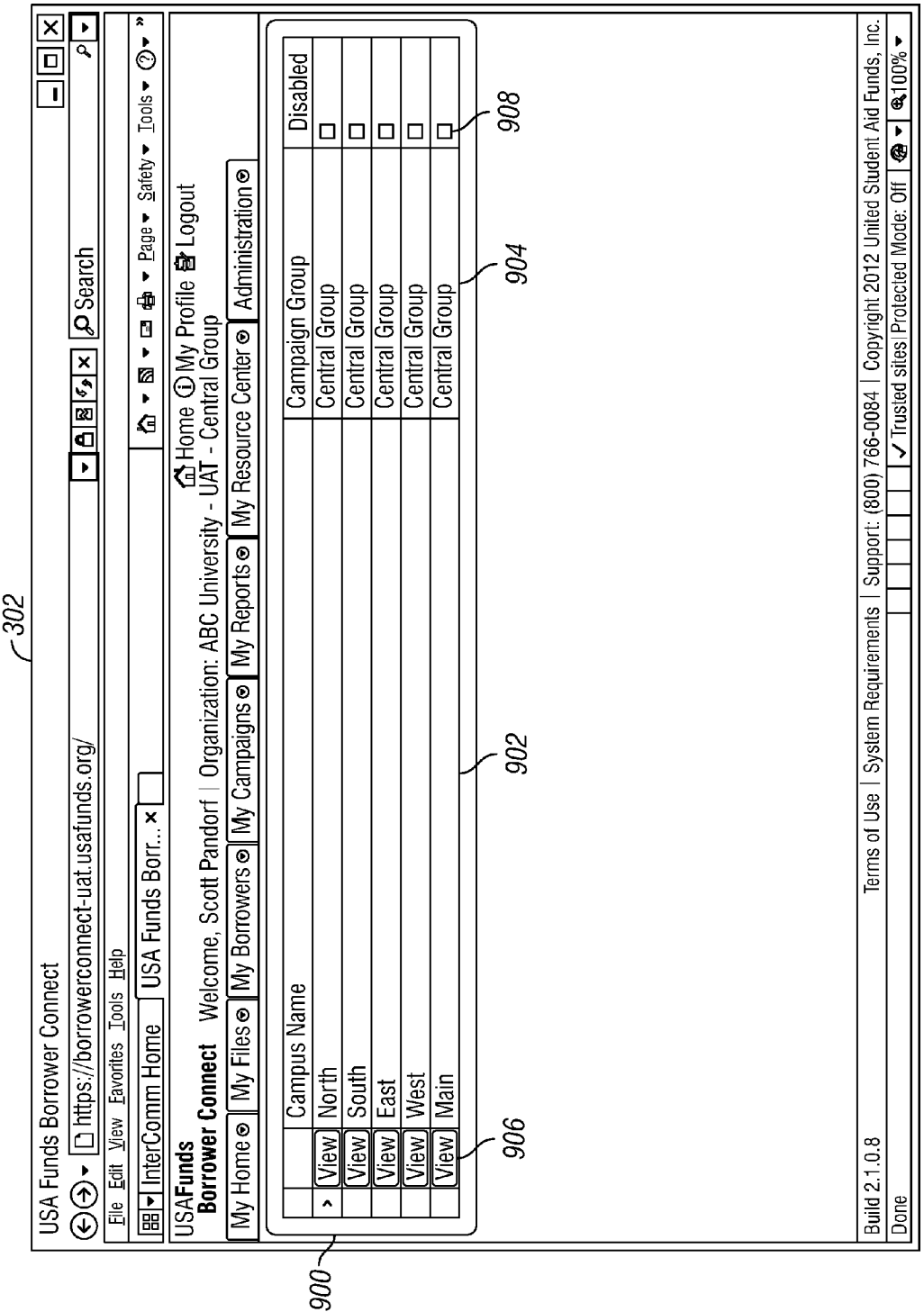
FIG. 9 shows a representative example of a campus list page.

Referring to FIG. 9, selection of the campus list application 426 generates a campus list page 900 in the web browser 302. Several universities have many campuses and the campus list page 900 allows the user 400 to view each campus that has been entered and stored in the system 100. As illustrated, the campus list page 900 includes a campus name field 902, a campaign group field 904, a view icon 906, and an enable/disable selection item 908. Each of these items are associated with each campaign group. The campaign group field 904 displays the campaign group to which each respective campus belongs. Selection of the view selection item 906 associated with each respective campus will generate the create campus page 1000 associated with that respective campus thus allowing the user to view and edit information related to that particular campus. Selecting the enable/disable selection item 908 will temporarily remove a respective campus from a campaign group. It should be appreciated that all data entered into the system by the user 400 is stored in one or more database files associated with the campus on the database server 128.

Figure 10:
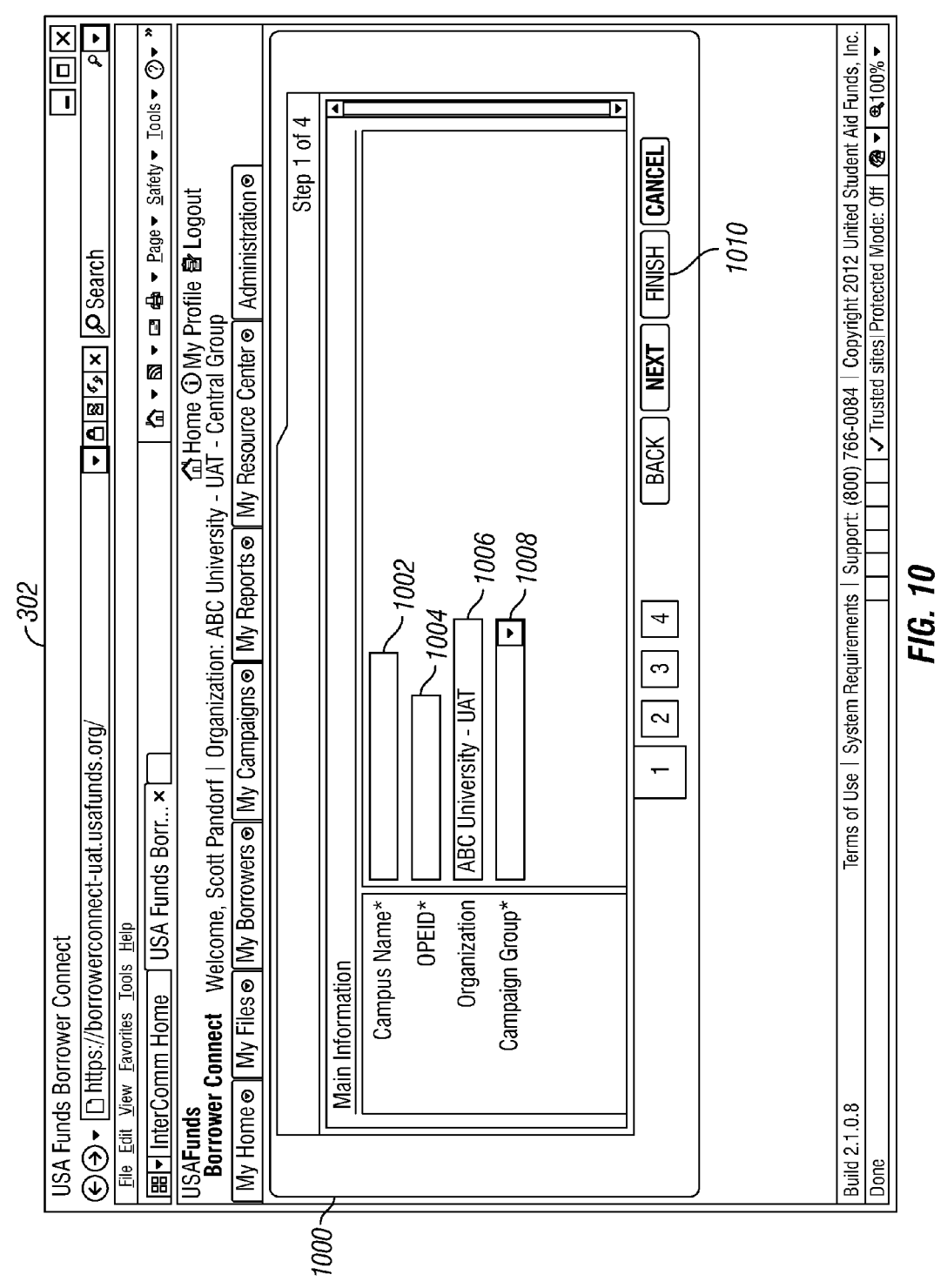

Referring to FIG. 10, selection of the create campus application 427 generates a create campus page 1000 in the web browser 302. The create campus page 1000 allows the user 400 to enter data associated with the educational institution. In the event that the educational institution has more than one campus, the user 400 may perform this task for each respective campus. As illustrated, in this representative page, the user 400 can enter a name of the campus in a Campus Name field 1002, enter an OPEID associated with the campus in a OPEID field 1004, enter an organization name associated with the campus in an Organization field 1006, and select what Campaign Group the campus will belong to by selecting a Campaign Group menu selection item 1008. Other data associated with the campus (e.g.— contact information, email address(es), and so forth) can be entered in subsequent pages generated by the create campus application 427 and once all information has been entered selection of the Finish icon 1010 causes the create campus application 427 to store the data on the database server 128.

Figure 11:
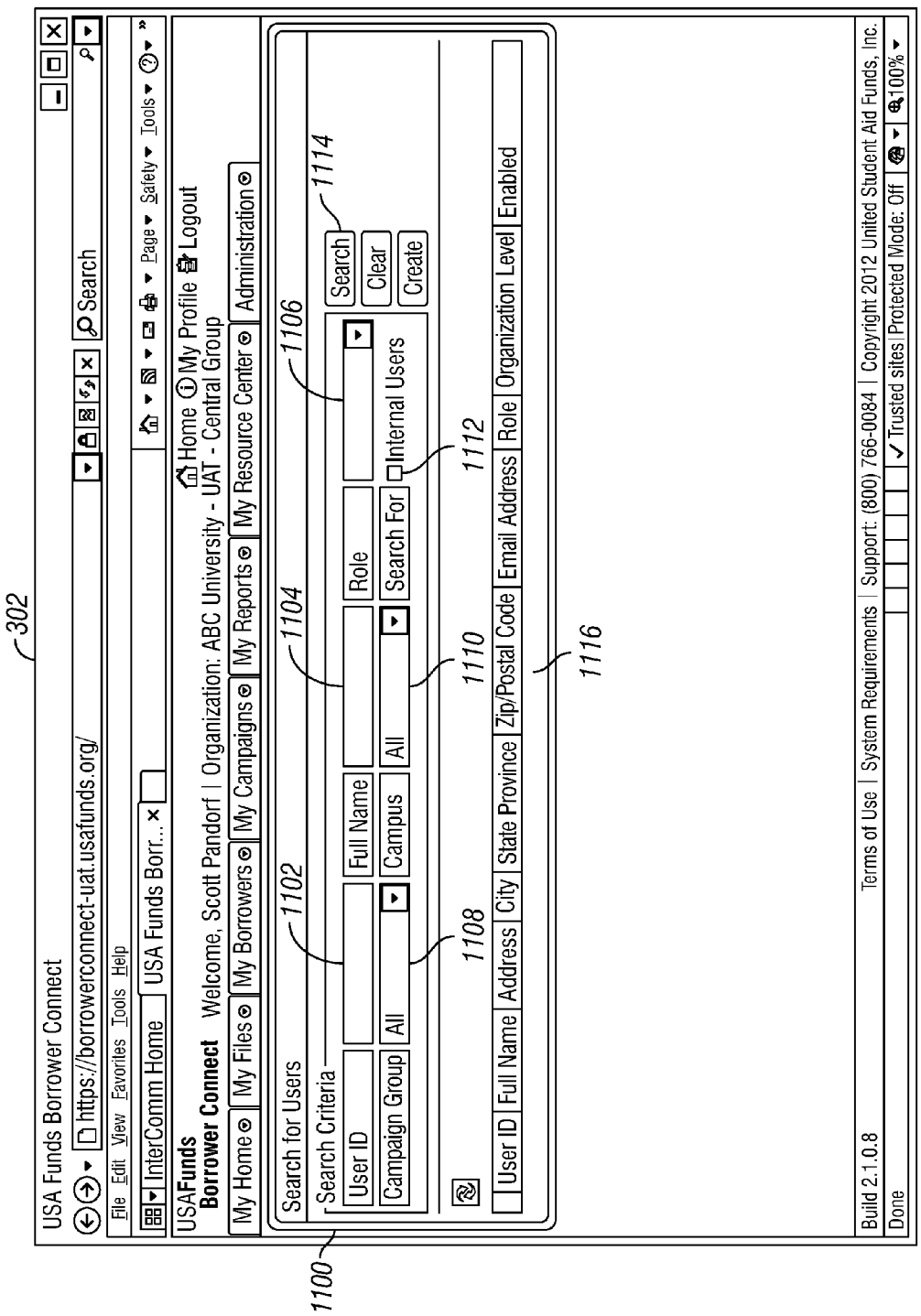
FIG. 11 shows a representative example of a user search page.

Referring to FIG. 11, selection of the user search application 428 generates a user search page 1100 in the web browser 302. The user search page 1100 allows the user 400 to locate other users of the system 100. The user search page 1100 includes a User ID entry field 1102 and a full name entry field 1104. The search criteria may also allow an implied wildcard or allow the user 400 to search by selection of a Role selection item 1106, a Campaign Group selection item 1108, and a Campus selection item 1110. Further, the user 400, if the user is an internal user, may also narrow the search by only searching for only internal users of the system 100 by selecting an Internal Users selection item 1112. Selection by the user 400 of the Search icon 1114 causes the user search application 428 to query the database on the database server 128 to obtain search results. The search results are then displayed to the user 400 in a search results display area 1116 located on the user search page 1100.

Figure 12:
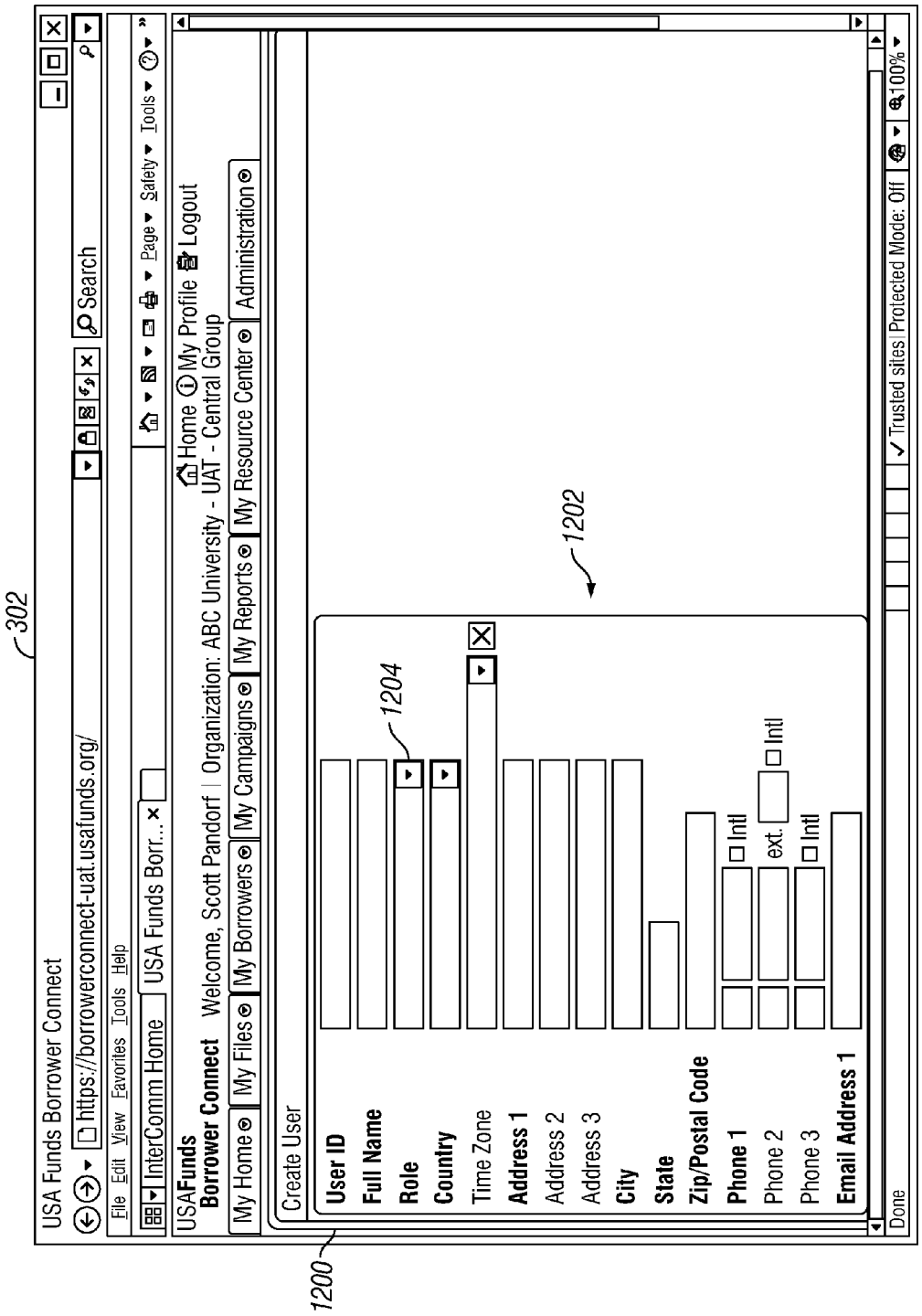
FIG. 12 shows a representative example of a create user page.

Referring to FIG. 12, selection of the create user application 430 generates a create user page 1200 in the web browser 302. The create user page 1200 includes a plurality of user data entry fields 1202 that allow the user to be identified in the system 100. These data entry fields 1202 include, but are not limited to, User ID, Full Name, Country, Time Zone, Address fields, Phone Number fields, email address fields, and so forth. A Role selection item 1204 is included that determines the amount of access any given user is provided to the system. Certain users may only be allowed access to certain features and this item determines the security level of the user. Once all relevant information is entered, the create user application 430 saves the entered data in the database on the database server 128.

Figure 13:
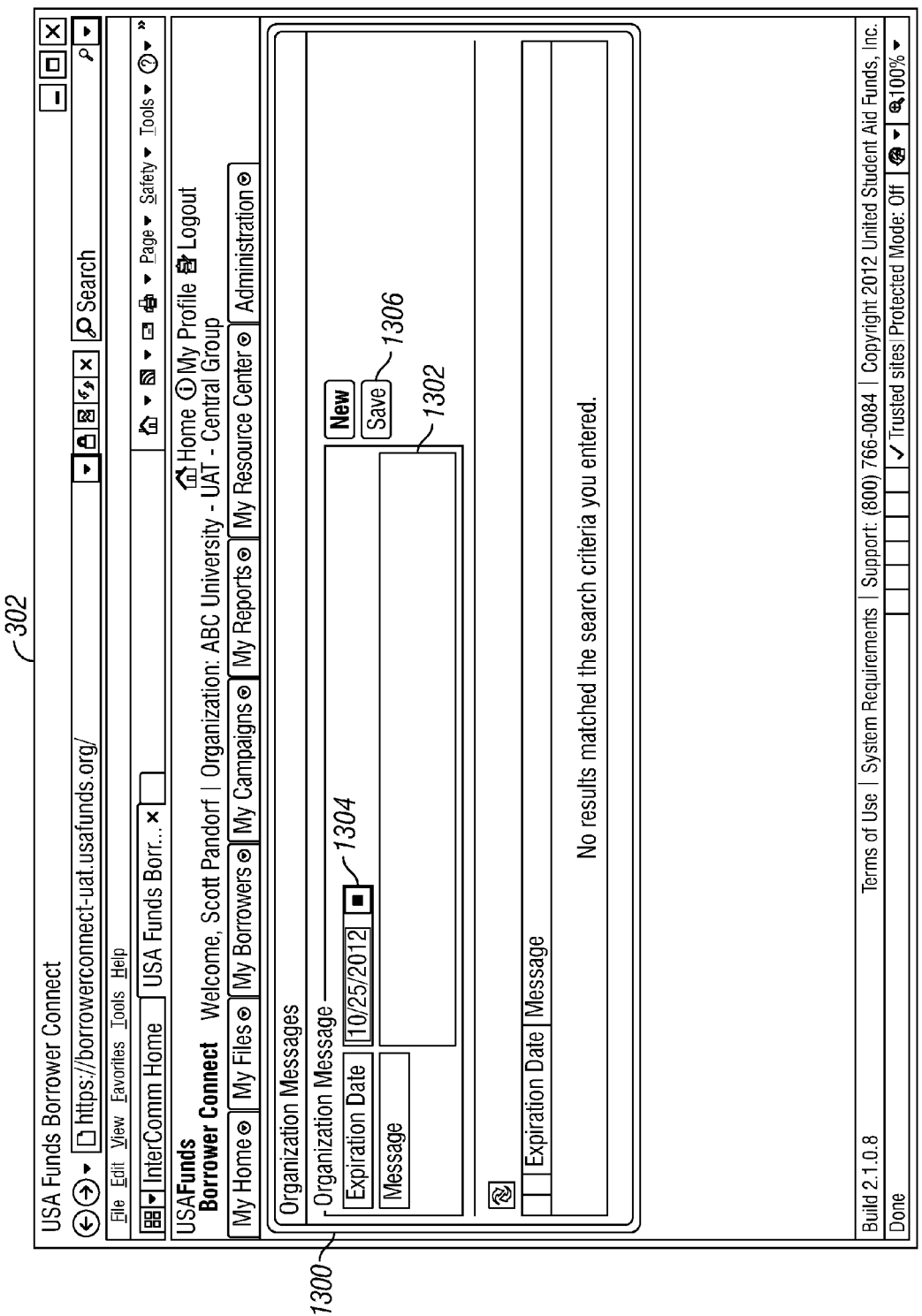
FIG. 13 shows a representative example of an organization message page.

Referring to FIG. 13, selection of the organization message application 432 generates an organization message page 1300 in the web browser 302. The organization message page 1300 allows the user 400 to generate messages that the My Messages view 526 allows individuals associated with an educational institution to view messages or information posted by the educational institution for each user of the organization that has access to the system 100. In one form, the organization message page 1300 includes a message entry field 1302 that allows the user 400 to enter the message to be delivered. This is a form of mass communication for users of the system 100 at a respective campus or organization. The organization message page 1300 includes an expiration date entry field 1304 that allows the user 400 to determine when the message will no longer be available for viewing. Once a save icon 1306 is selected by the user 400, the message becomes posted for viewing and stored in the database on the database server 128.

Referring to FIG. 14, selection of the communication code application 434 generates a communication code page 1400 in the web browser 302. The communication code page 1400 allows the user 400 to review, update or create communication codes for the university to be applied when logging communications in the Log Communication page 1790. The communication codes allow schools to create a unique set of communication codes for their institution. This allows standardized application of communication history comments. This includes the name, descriptions and communication type (outgoing, incoming and other) to log against the borrower account. These activities could include telephone calls both to and from the borrower, letters and emails sent to and received from the borrower, payments made by the borrower to the servicer, communications about the loan servicer, personal visits from the borrower, and so on.

Selection of a New Communication Code selection item or icon 1402 pulls up an entry page that allows the user 400 to define a communication code for their institution. This includes the short name (code), description and type and relevant information as it relates to communications, which will be discussed below. Selection of a Sort My Codes selection item 1404 allows the user 400 to determine the sort order that communication codes are displayed in the Log Communication page 1790 for each borrower. See FIG. 17*d*. This allows the user 400 to present the most frequently used code to the least frequent, and so on. As illustrated, several different categories are listed for the user 400 to enter information about or determine when and who a communication code was created or updated. These include a Category entry field 1406, a Name entry field 1408, a Description entry field 1410, a Follow-Up Days entry field 1412, an Exclude Days entry field 1414, a Status display field 1416, a Date Last Updated display field 1418, and a Last Updated By display field 1420. The Category entry field 1406 allows the user 400 to select a type of communication code to be created for future use in a Log Communication page 1790. These could include, by way of example, an incoming call, outgoing call, payment made, incoming email, outgoing email, incoming letter, outgoing letter, borrower walk-in, and so forth.

The Name entry field 1408 allows the user 400 to define a general type of activity to be defined by the school (user defined field or short name for the description). This is used to provide a short description to define the communication code. These could include, by way of example, a form being sent to the borrower, the borrower didn't answer the phone, left a voicemail, incoming call, outgoing call, incoming fax, outgoing fax, payment made, incoming email, outgoing email, incoming letter, outgoing letter, borrower walk-in, and so forth. Basically, these codes can be created to document any type of activity for a borrower account. The Description entry field 1410 allows the user 400 to create a long description of the communication code defined in the Name entry field 1408. The Follow-Up Days entry field 1412 allows the user 400 to define a predetermined time frame in which a follow-up communication needs to be made with the borrower for this particular code. This allows the user 400 to define that this particular communication code requires a standard follow up period that will be universally applied to borrower accounts when the code is selected in the Log Communication page 1790.

The Exclude Days entry field 1404 allows the user 400 to define an amount of days in which the borrower is not to be contacted based on the communication code selected. For example, this would disable the borrower from appearing in a calling, letter or email campaign for the duration indicated. This allows the user 400 to define that this particular activity code requires a standard exclude period that will be universally applied to borrower accounts when the code is selected in the Log Communication page 1790. A Status display field 1416 is provided so that the user 400 is provided so that the user 400 knows the current status of the communication code (Active/Deactivated).

A Date Last Updated field 1418 is displayed that shows the last time the communication code was updated. A Last Updated By field 1420 is included that displays the last user that updated the communication code. All of this information is stored in the database on the database server 128. An Edit selection item 1422 is included that allows the user 400 to edit each communication code (Category, Name, Description, Follow-Up Days and Exclude Days). A Disable selection item 1424 is included that allows the user 400 to disable or enable the communication code. The functions described above allow the school to create a unique set of communication codes that can be used to manage borrower accounts. These codes are then displayed in the borrower loan detail screen within the Log Communication page 1790 to be selected as appropriate. The purpose is to create a common set of communication codes for borrower history comments. This saves time for end users 400 since they only need to select the communication code and not manually type the additional information and provides a method for the school to update records with standard text and a standard set of language and rules.

Figure 15:
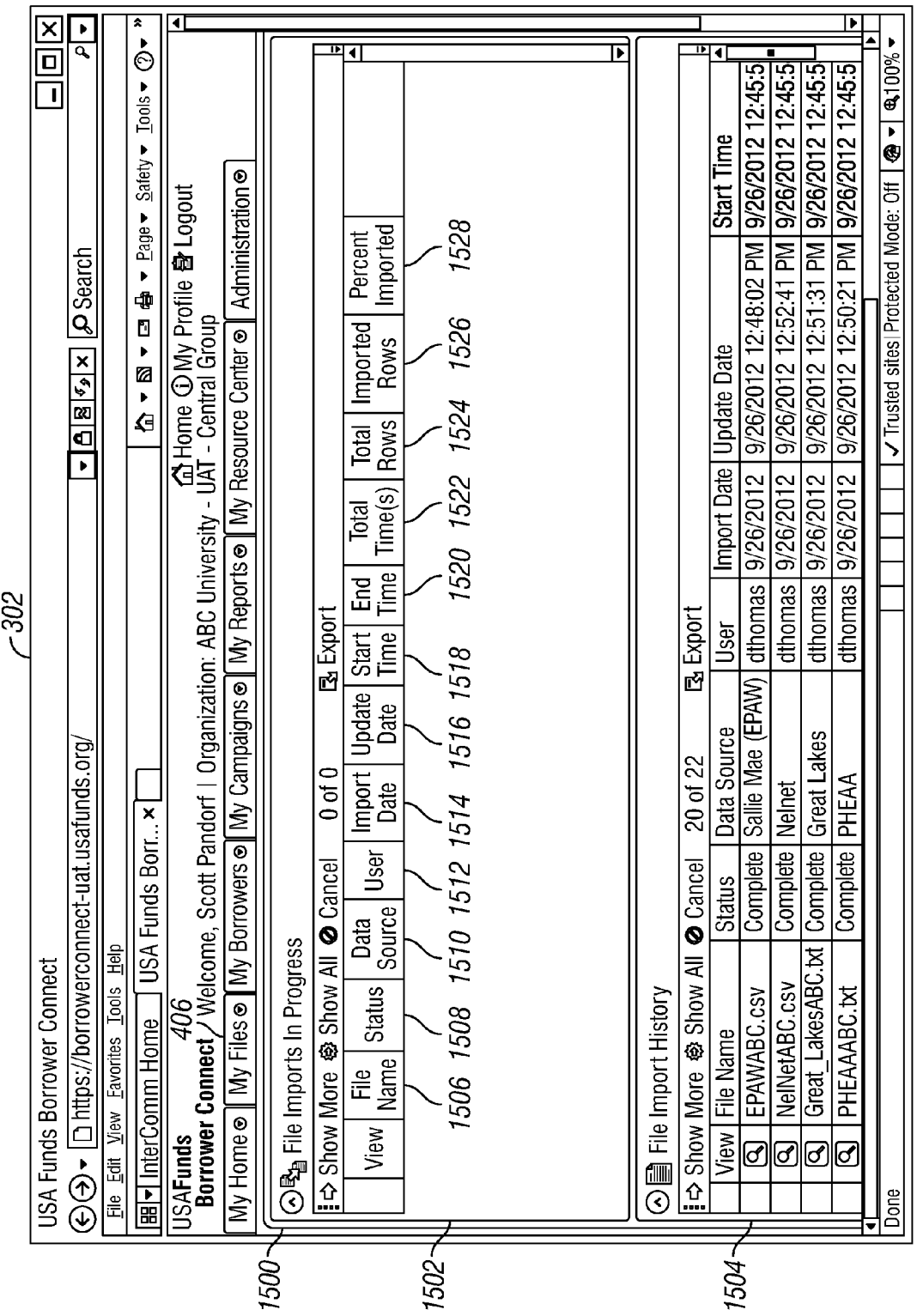
FIG. 15 shows a representative example of a file import dashboard page.

Referring to FIGS. 4 and 15, selection of the My Files selection item or icon 406 starts the my files application 406. The my files application 406 generates a page in the web browser 302 that allows the user 400 to select between launching a file import dashboard application 436 or a file import application 438.

Referring to FIG. 15, selection of the file import dashboard application 436 generates a file import dashboard page 1500 in the web browser 302. The file import dashboard page 1500 is operable to display details of file imports in progress and details of past file imports. As illustrated, the file import dashboard page 1500 includes a File Imports In Progress display area 1502 and a File Import History display area 1504. Each of these display areas 1502, 1504 display the same type of data, the first displaying data about the progress of current file imports and the second displaying historical data about file imports. The data that is displayed is generated from data contained in the database located on the database server 128. The files that are imported are files that are generated from lending institutions and governmental agencies. The files contain data about a borrower's respective student loans. The exact nature of how the files are imported into the system 100 is set forth in greater detail below.

The display areas 1502, 1504 are operable to display various data values to the user 400. These data values include: a File Name display 1506, a Status display 1508, a Data Source display 1510, a User display 1512, an Import Date display 1514, an Update Date display 1516, a Start Time display 1518, an End Time display 1520, a Total Time(s) display 1522, a Total Rows display 1524, an Imported Rows display 1526, and a Percent Imported display 1528. The File Name display 1506 shows the name of the file that is imported into the system 100. The Status display 1508 shows the current status of the file that is imported into the system 100. The Data Source display 1510 shows the name of the institution from which the data that is being imported is received (e.g. —NSLDS, Great Lakes, and so forth). The User display 1512 shows the name of the user 400 that uploaded or imported the data file into the system 100 and the Import Date display 1514 shows the date in which the file was imported. The Update Date display 1516 shows the date and time that the borrower connect application last updated the Status display 1508.

The Start Time display 1518 shows the time that the file being imported was first started to be uploaded into the system 10 and the End Time display 1520 shows the time in which the import process was completed. The Total Time(s) display 1522 shows the total time it took to import the file. The Total Rows display 1524 shows the total number of rows of data that were contained in the file. The Imported Rows display 1526 shows the actual number of rows that were imported into the system from the total number of rows of data that were contained in the file. The Percent Imported display 1528 shows the percentage of the file that was actually imported into the system 100 so that the user 400 knows if data might be missing or what percentage was valid data based on predefined parameters.

Figure 16:
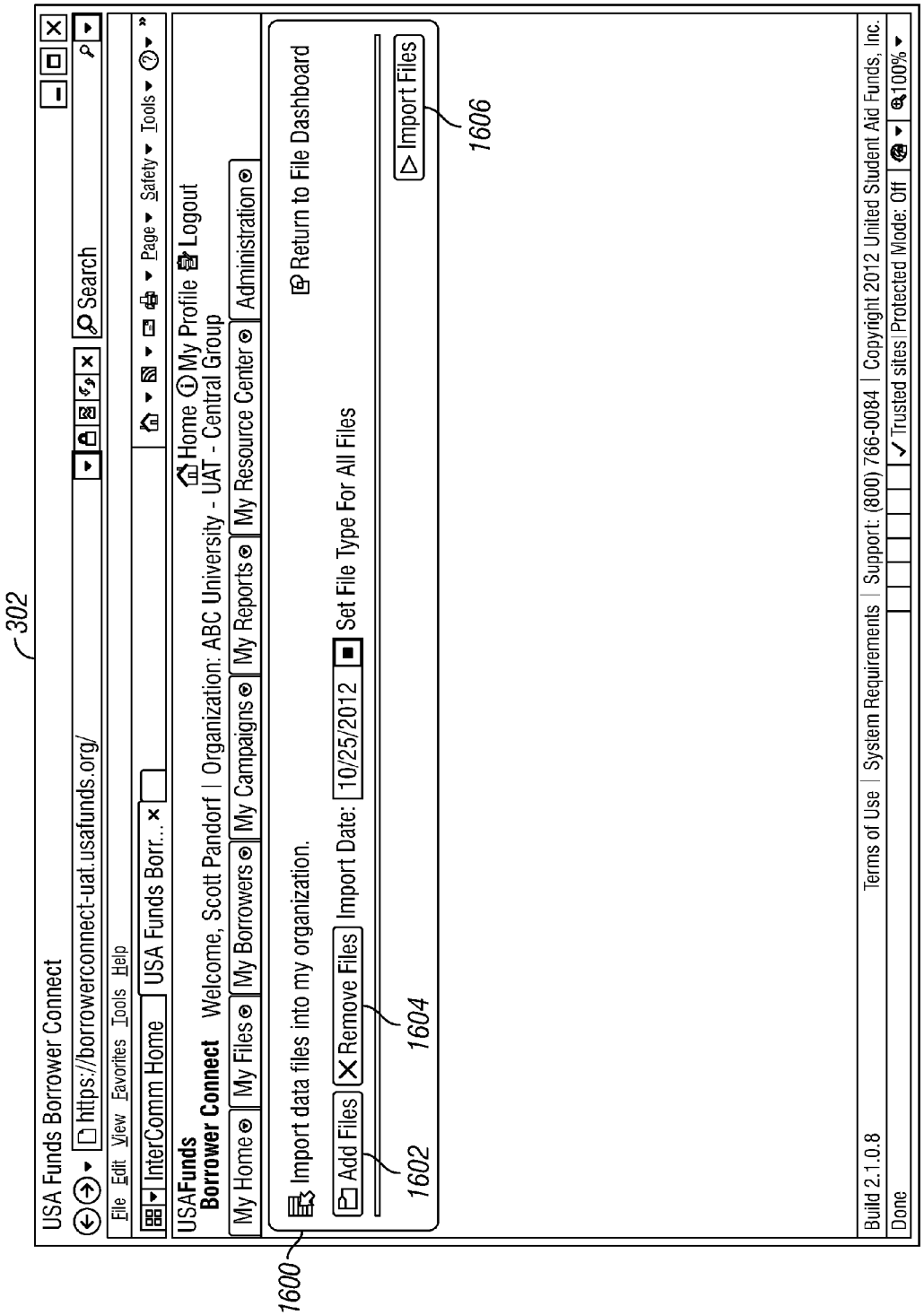
FIG. 16 shows a representative example of a file import page.

Referring to FIG. 16, selection of the file import application 438 generates a file import page 1600 in the web browser 302. The file import page 1600 allows the user 400 to import files that contain borrower data into the system 100. The loan data files that are imported may be stored in a local storage medium associated with the remote terminal 106 or in a database to which the remote terminal 106 has access. The file import page 1600 includes an Add Files selection item 1602 that allows the user 400 to add files to be imported into the system 100. The file import page 1600 also includes a Remove Files selection item 1604 that allows the user 400 to remove files to be imported. Once all of the files to be imported have been added, the user 400 selects an Import Files selection item 1606 that causes the borrower connect application to begin importing the respective borrower data files into the system 100.

The borrower loan data files that can be imported are student loan borrower data files that are obtained by the educational institution from a plurality of loan service providers or the NSLDS. Within each of these student loan borrower data files are a plurality of records associated with students of the educational institution. As set forth in greater detail below, once the student loan borrower data files are uploaded to one of the servers a data processing application aggregates the loan records contained in each borrower data file uploaded into a single loan database record associated with the educational institution. This is a key feature of the system 100 because it provides the educational institution with a single source to view and manage information associated with student loans. Prior to this, educational institutions had to manage the information by viewing loan records contained in multiple files using various different applications to view the data.

Figure 17:
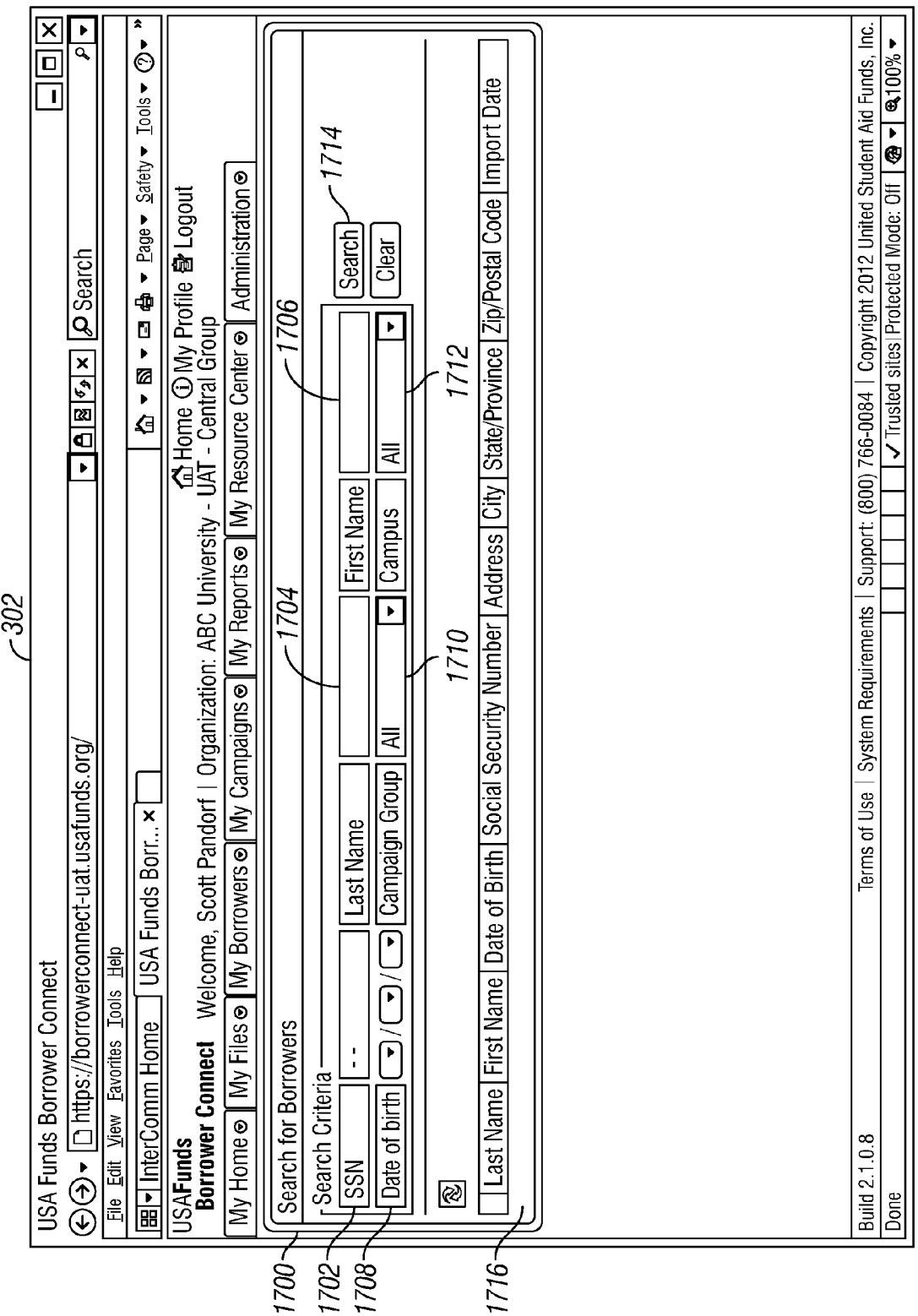
FIG. 17 shows a representative example of a find my borrower page.

Referring to FIGS. 4 and 17, selection of the Find My Borrowers application 408 generates a find my borrowers page 1700 in the web browser 302. The find my borrowers page 1700 allows the user 400 to search for borrowers. The find my borrowers page 1700 includes a social security number entry field 1702, a last name entry field 1704, a first name entry field 1706, a date of birth entry field 1708, a campaign group scroll bar 1710, and a campus scroll bar 1712. These entry fields 1702-1708 and scroll bars 1712-1714 allow the user to search for borrowers through the entry of relevant information about the borrower. Once the relevant information is entered, which does not require entry of information in each field, a Search selection item 1714 is selected and the relevant results are shown in a borrower display 1716 as illustrated in FIG. 17a.

Selection of a View selection item 1718 in the borrower display 1716 next to a respective borrower causes the Find My Borrowers application 408 to generate a Borrower Details page 1720. The Borrower Details page 1720 includes an informational header 1721 that displays the borrower's name, social security number, and date of birth. As further illustrated, the Borrower Details page 1720 includes an address information field 1722, a phone and email information field 1724, a call queue information field 1726, a loan summary information field/tab 1728, and a communication history field/tab 1730. The address information field 1722 displays the address of the borrower and the phone and email information field 1724 displays telephone numbers and email addresses associated with the borrower. The call queue information field 1726 includes an exclude until date selection item 1732 and entry field 1734 that allows the user 400 to enter in a date range in which the borrower will not be contacted. A follow-up date selection item 1736 is included that allows the user 400 to enter a date to follow-up with the borrower in a follow-up date enter field 1738.

The Borrower Details page 1720 includes a loan summary tab 1728 that when selected displays all of the loan details for a respective borrower. A loan summary display field 1740 is included that displays details about respective loans of the borrower. The information displayed includes a loan type display field 1742, an outstanding principal display field 1744, a status display field 1746, a cohort year display field 1748, a days delinquent display field 1750, an OPEID display field 1752, and an update date display field 1754. Referring to FIG. 17c, selecting a view icon 1756 in the loan summary display field 1740 will cause a borrower display window 1760 to be generated and displayed to the user 400. The information listed in the loan display window 1760 may include, a Loan Identifier, a Data Source, a Loan Type, a Cohort Year, a Guarantor/Federal Servicer ID, a Current Lender ID, a Loan Period Begin Date, a Loan Period End Date, a Loan Status, a Loan Status Effective Date, a Loan Status End Date, a Claim Type, an Enrollment Status, an Enrollment Effective Date, a Date Entered Repayment, a Days Delinquent, a Delinquency Effective Date, a Total Disbursed Amount, and an Outstanding Principal Balance.

Referring to FIG. 17d, selecting the communication history tab 1730 causes the Find My Borrowers application 408 to generate a communication history display field 1770. The communication history display field 1770 includes a date display field 1772, a communication category display field 1774, a communication code display field 1776, a description display field 1778, a notes display field 1780, and a user ID display field 1782. The date display field 1772 displays the dates in which the borrower was contacted by the school. The communication category display field 1774 displays the type of communication that was made to the borrower. The communication code display field 1776 displays the communication code associated with the type of communication that was made to the borrower. These communication codes were described above and constitute the custom codes created by the school. The description display field 1778 displays an optional description of the communication. The notes display field 1780 displays notes that are entered by the user 400 about the communication that is made with the borrower. A Log Communication selection item 1784 is contained in the Borrowers Details page 1720 that when selected generates a pop-up window or page that allows the user to log a communication with the borrower.

Referring to FIG. 17e, when the Log Communication selection item is selected, a Log Communication page 1790 is generated that allows the user 400 to log a communication with a borrower. As illustrated, the Log Communication page 1790 includes a Communication Categories selection item 1792, a Communication Name selection item 1793, a Notes entry field 1794, a Follow-Up Days action item 1795, and an Exclude Days action item 1796. The Communication Categories selection item 1792 allows the user to designate the general type of communication that took place between the educational institution and the borrower (e.g.—incoming call, outgoing call, email sent, borrower walk-in, letter sent, and so forth). The Communication Name selection item 1793 allows the user to select a name for the communication. The Notes entry field 1794 allows the user to enter notes about the communication. The Follow-Up Days action item 1795 allows the user to designate the number of days in which a follow-up communication should occur with the borrower. The Exclude-Days action item 1796 allows the user to designate an amount of days that the borrower should not be contacted. After this information is entered, it is stored in database 122 and data associated with the borrower is updated accordingly.

Figure 18:
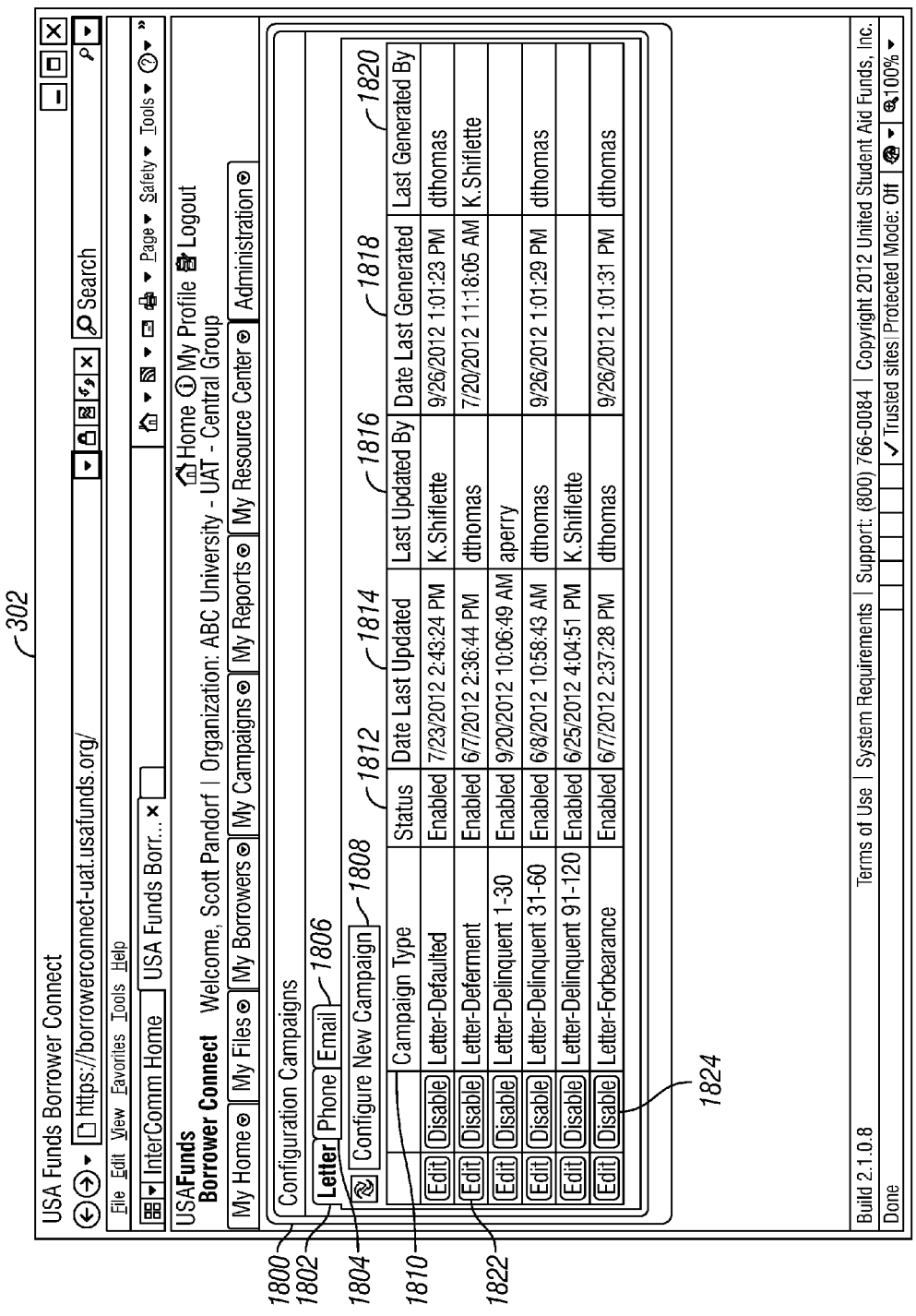
FIG. 18 shows a representative example of a configure campaign page.

Referring to FIGS. 4 and 18, selection of the My Campaign application 410 generates a campaign page or menu (not illustrated) that allows the user to select from a configure campaign application 440, a generate campaign application 442, a view/export campaign application 444, a campaign history application 446, and a campaign logos application 448. The configure campaign application 440 allows the user 400 to create and maintain campaigns (e.g.—letters, phone calls, and emails). The generate campaigns application 442 allows the user 400 to generate campaigns that have been configured by the configure campaign application 440. The view/export campaign application 444 displays, and allows export or execution of the campaigns that have been generated for the organization. The campaign history application 446 displays the history of campaigns that have been configured, generated, updated, and completed for the organization. The campaign logos application 448 allows the user to add and maintain logos used by letter and email campaigns.

As illustrated in FIG. 18, selection of the configure campaign application 440 generates a configure campaign page 1800 in the web browser 302 on the remote terminal 106. The configure campaign page 1800 displays a list of campaigns that have been created by the educational institution, which includes letter campaigns, phone campaigns, and email campaigns. The configure campaign page 1800 also allows the organization to configure or modify various types of communications campaigns to borrowers in various states of repayment. As illustrated, three categories of campaigns are illustrated in FIG. 18, which include a letter campaign category selection item 1802, a phone campaign category selection item 1804, and an email campaign category selection item 1806. The configure campaign page 1800 also includes a Configure New Campaign selection item 1808 that allows the user 400 to add a new campaign from an existing list of campaign types to the list of campaigns set forth in FIG. 18. For example, the user 400 may add a new letter that can be sent to borrowers that are in default or delinquent. Selection of a respective selection item 1802, 1804, 1806, will cause the configure campaign page 1800 to update to that respective campaign type (e.g.—letter, phone, email) and display the current campaigns that have been configured for the educational institution. In alternative forms, all campaigns that have been created by the educational institution could be listed in the configure campaign page 1800.

Referring to FIG. 18, six types of campaigns are illustrated, but up to 15 types of campaigns can be created for borrowers in various states of repayment status. The configure campaign page 1800 includes a Campaign Type category 1810, a Status category 1812, a Date Last Updated category 1814, a Last Updated By category 1816, a Date Last Generated category 1818, and a Last Generated By category 1820. The Campaign Type category 1810 lists the type of campaigns that have been created and can be used for borrowers in various states of repayment. As illustrated in this example, which relates to letter campaigns, a letter has been generated that can be sent to borrowers who are defaulted, a letter has been generated that can be sent to borrowers who are in deferment, a letter has been generated that can be sent to borrowers who are delinquent from 1-30 days, a letter has been generated that can be sent to borrowers who are delinquent from 31-60 days, a letter has been generated that can be sent to borrowers who are delinquent from 61-120 days, and a letter has been generated that can be sent to borrowers who are in forbearance. This page only lists campaigns that have already been configured.

Referring to FIG. 18a, if the letter campaign category selection item 1802 has been selected and the Configure New Campaign selection item 1808 is selected, the configure campaign application 440 will generate a new letter campaign configuration page 1830 that is displayed on the remote terminal 106. The new letter campaign configuration page 1830 includes a Campaign Type selection item 1832, a Content entry field 1834, a Logo selection item 1836, a Signatory Definition entry field 1838, and a Save selection item 1840. Selection of the Campaign Type selection item 1832 will generate a drop-down menu that allows the user 400 to select a campaign type from one of fifteen different campaign types, but it should be appreciated that other campaign types may be added from time to time. In one form, the fifteen campaign types that may be selected include:

1) Grace All (borrower with a grace status);

2) Grace Graduated (borrower with a grace status and enrollment status of graduated);

3) Grace less than half-time (borrower with a grace status and enrollment status of less than half-time);

4) Grace Withdrawn (borrower with grace status and enrollment status of withdrawn);

5) Grace Other (borrower with grace status and enrollment status does not equal graduated, less-than-half-time, or withdrawn);

6) Deferment (borrower in some type of deferment);

7) Forbearance (borrower in some type of forbearance);

8) Delinquent 1-30 (borrower reported delinquent up to 30 days);

9) Delinquent 31-60 (borrower reported delinquent between 31-60 days);

10) Delinquent 61-90 (borrower reported delinquent between 61-90 days);

11) Delinquent 91-120 (borrower reported delinquent between 91-120 days);

12) Delinquent 121-180 (borrower reported delinquent between 121-180 days);

13) Delinquent 181-270 (borrower reported delinquent between 181-270 days);

14) Delinquent 271-360 (borrower reported delinquent between 271-360 days); and

15) Default (borrower reported as defaulted).

The type of campaign selected by the user 400 serves several different purposes for the purpose of the present invention. First, in one form the campaign type that is designated by the user 400 will cause the configure campaign application 440 to automatically fill in a preconfigured written communication in the Content entry field 1834 that has been specifically written to cover situations related to the selected campaign type in the case of letter and email campaigns. For example, different statements would be used to deal with different stages of delinquency as well as for borrowers who were in a grace period, deferment period, or default status. The user 400 may or may not elect to use these preconfigured written communications or may choose to edit them.

The campaign type that is selected by the user 400 is also used by the generate campaigns application 442 to determine what borrowers will be targeted by the campaign. As such, the borrowers that will be targeted by a respective campaign are determined as a function of the campaign type 1810 that is selected by the user 400. For example, the generate campaigns application 442 will know that if a default campaign type is selected, it will only obtain borrowers who are in a defaulted status to add to the campaign. The same holds true for all of the other campaign types 1802 that are listed above. As such, the generate campaigns application 442 queries the aggregated loan database record in the borrower database 122 to obtain borrowers that satisfy predetermined criteria associated with a respective campaign type. A borrower list is then generated by the generate campaigns application 442 that includes borrowers that satisfy the criteria for that particular campaign type.

As generally set forth above, the new letter campaign configuration page 1830 also includes a Content entry field 1834 that in one form is automatically populated or filled with written text as a function of the campaign type 1810 selected by the user 400. The user 400 may then go in and edit the text or may simply accept the text that is provided by the generate campaign application 422. The Logo selection item 1836 allows the user 400 to select a logo (e.g.— educational institution logo) to be used in the letter that will be sent to the borrower. As discussed below, the user 400 can upload educational institution logos to the borrower database 122 associated with the educational institution. The Signatory Definition entry field 1838 allows the user 400 to enter contact information for the person that will be designated as sending the letter. After entering all of the desired information and selections, selection of the Save selection item 1840 will cause the configure campaign application 440 to store the campaign that has been created in the borrower database 122. The newly created campaign will now appear in the configure campaign page 1800 illustrated in FIG. 18 when the letter campaign category selection item 1802 is selected by the user 400.

Referring to FIG. 18, if the phone campaign category selection item 1804 has been selected by the user 400, all phone campaigns that have been created for the educational institution will appear in the configure campaign page 1800. Items 1810-1824 will remain the same except that each campaign type illustrated in the Campaign Type category 1810 will be associated with a phone campaign. All fifteen campaign types are available for use in connection with phone campaigns just the same as letter campaigns. One of ordinary skill in the art would understand that the same holds true for selection of the Email campaign category selection item 1806.

Referring to FIG. 18b, if the configure new campaign selection item 1808 is selected by the user 400 when the phone campaign category selection item 1804 is active or selected, the configure campaign application 440 will generate a new phone campaign configuration page 1850 on the remote terminal 106. The new phone campaign configuration page 1850 includes a Campaign Type selection item 1852, a Sort by Field Name selection item 1854, a Sort Direction selection item 1856, and a Save selection item 1858. The Campaign Type selection item 1852 allows the user 400 to select the type of campaign that is being created from the list of campaign types set forth above with respect to letter campaigns. The Sort by Field Name selection item 1854 allows the user 400 to determine the order that information will be displayed in the call queue. The options for this selection item 1854 include: by name, by social security number, or by days delinquent. The Sort Direction selection item 1856 allows the user 400 to indicate a sort order for the value selected using the Sort by Field Name selection item 1854 and includes ascending or descending.

As with letter campaigns, the Save selection item 1858 will cause the configure campaign application 440 to store the phone campaign that has been created in the borrower database 122. The newly created phone campaign will now appear in the configure campaign page 1800 illustrated in FIG. 18 when the phone campaign category selection item 1802 is selected by the user 400. Those skilled in the art would recognize that as with letter campaigns all borrowers included in a respective phone campaign would be determined by the type of campaign that is created and as such, a detailed discussion of this does not need repeated.

Referring to FIG. 18c, if the configure new campaign selection item 1808 is selected by the user 400 when the email campaign category selection item 1806 is active or selected, the configure campaign application 440 will generate a new email campaign configuration page 1880 on the remote terminal 106. Other than Subject entry field 1884, items 1882 and 1886-1892 are the same as those discussed above with respect to the creation of a new letter campaign. The Subject entry field 1884 allows the user 400 to enter a subject that will be included in the subject line of a standard email. It should be appreciated that a Subject entry field could also be included in letter campaigns as well. For the sake of brevity, all of the discussion of creating a new letter campaign is incorporated herein by reference except that instead of a letter, this campaign is for an email that is sent electronically to the borrower instead of being mailed.

Referring back to FIG. 18, an Edit selection item 1822 is included that allows the user 400 to edit each campaign (letter, phone, email) that is created for an educational institution. A Disable selection item 1824 allows a user 400 to temporarily disable a respective campaign (letter, phone, email) from being used by the educational institution. The Edit selection item 1822 and Disable selection item 1824 appear in each display regardless of what campaign category 1802, 1804 or 1806 is selected.

As illustrated in FIG. 19, selection of the generate campaigns application 442 generates a generate campaigns page 1900 in the web browser 302 on the remote terminal 106. The generate campaigns page 1900 displays a list of active campaigns that have been created by the educational institution. In this form, the list of active campaigns are sorted by letter campaigns, phone campaigns, and email campaigns. Campaigns that have been created, but disabled in the configure campaigns page 1800, do not appear in the list of active campaigns. As with the configure campaigns page 1800, the user can switch between campaigns that are displayed by selected the letter campaign category selection item 1802, the phone campaign category selection item 1804, and the email campaign category selection item 1806. In alternative forms, all active campaigns could be listed in the generate campaigns page 1900.

The generate campaigns page 1900 allows a user 400 to put into action or implement campaigns (letter, phone, email) that have been created using the configure campaigns application 440 set forth above. Each of the campaigns created using the configure campaigns application 440 under the Campaign Type category 1810 are listed in the generate campaign page 1900 under each selection item (letter, phone, email) as discussed above. A Generate selection item 1902 is included that once selected by a user 400 causes the generate campaigns application 442 to set into action or implement the particular campaign. For example, if the Generate selection item 1902 associated with the "defaulted" Campaign Type category 1810 illustrated in FIG. 19 is selected by the user 400, the generate campaign application 442 will cause letters to be generated for each borrower that is in a default status. A similar page would be generated upon selection of either the phone campaign category selection item 1804 or the email campaign category selection item 1806.

As previously set forth, the generate campaigns application 442 uses the campaign type to determine what borrowers should be included or excluded from each respective campaign as a function of data contained in the borrower loan data files with respect to each borrower. Only borrowers that fit predefined criteria for a particular campaign type (e.g.—defaulted, delinquent, and so forth) will be included in the selected campaign. The generate campaigns application 442 uses these criteria to generate a borrower list that includes borrowers that satisfy the predetermined criteria associated with a respective campaign type. The borrower list contains contact information (e.g.—address, phone number, email address, loan status, and so forth) related to the borrowers that the generate campaigns application 442 uses to implement the respective selected campaign.

In one form, the borrower connect application 210 sends an electronic file to the electronic campaign server 110 that causes the organization associated with the electronic campaign server 110 to take the desired action associated with the campaign (e.g. —letters, emails, phone calls). In this example, the organization associated with the electronic campaign server 110 would print and mail the letters to the borrowers that are in default, for example. In the case of email campaigns, the system will automatically send the emails on behalf of the organization associated with the electronic campaign server 110. In other forms, the organization associated with the electronic campaign server 110 would conduct telephone calls to the borrowers in the case of phone campaigns. In other forms, the educational institution itself can print and send the letters, conduct the phone calls, and send the emails. In one form, the phone call campaigns are live calls or messages left to inform borrowers of the relevant information. Various different methods exist to implement the campaigns once they are selected to be generated.

Referring to FIG. 19, the generate campaign page 1900 includes a View Borrower List selection item 1904 that when selected queries the database on the database server 128 and obtains a list of the borrowers to be included and excluded (excluded if valid contact information is not available) in a particular Campaign Type category 1810. The generate campaigns application 442 is operable to display a pop-up window or new page that displays the borrowers and their applicable data related to a given campaign. The generate campaigns application 442 generates the borrowers list that contains contact data (i.e.—name, address, phone number, email address) applicable to each borrower with respect to a given campaign that is created and implemented. The borrowers list is created as a function of the campaign type and a search of the aggregated loan database that is contained in the borrower database 122.

The generate campaign page 1900 includes a Preview Content selection item 1906 that displays the communication that will be sent to the borrowers that fall into a particular Campaign Type category 1810. If the Preview Content selection item 1906 is selected, a pop-up window or new page is generated by the generate campaigns application 442 that shows the content of the particular communication that has been generated. The generate campaign page 1900 also includes a Date Last Generated category 1908, a Last Generated By category 1910, a Last Completed By category 1912, and a Date Last Completed category 1914. The Date Last Generated category 1908 displays to the user 400 the last time a campaign was initiated or set into action. The Last Generated By category 1910 displays the user that generated the last campaign. The Last Completed By category 1912 displays the user who last completed the relevant campaign. The Date Last Completed category 1914 displays the date in which the relevant campaign was completed.

Figure 20:
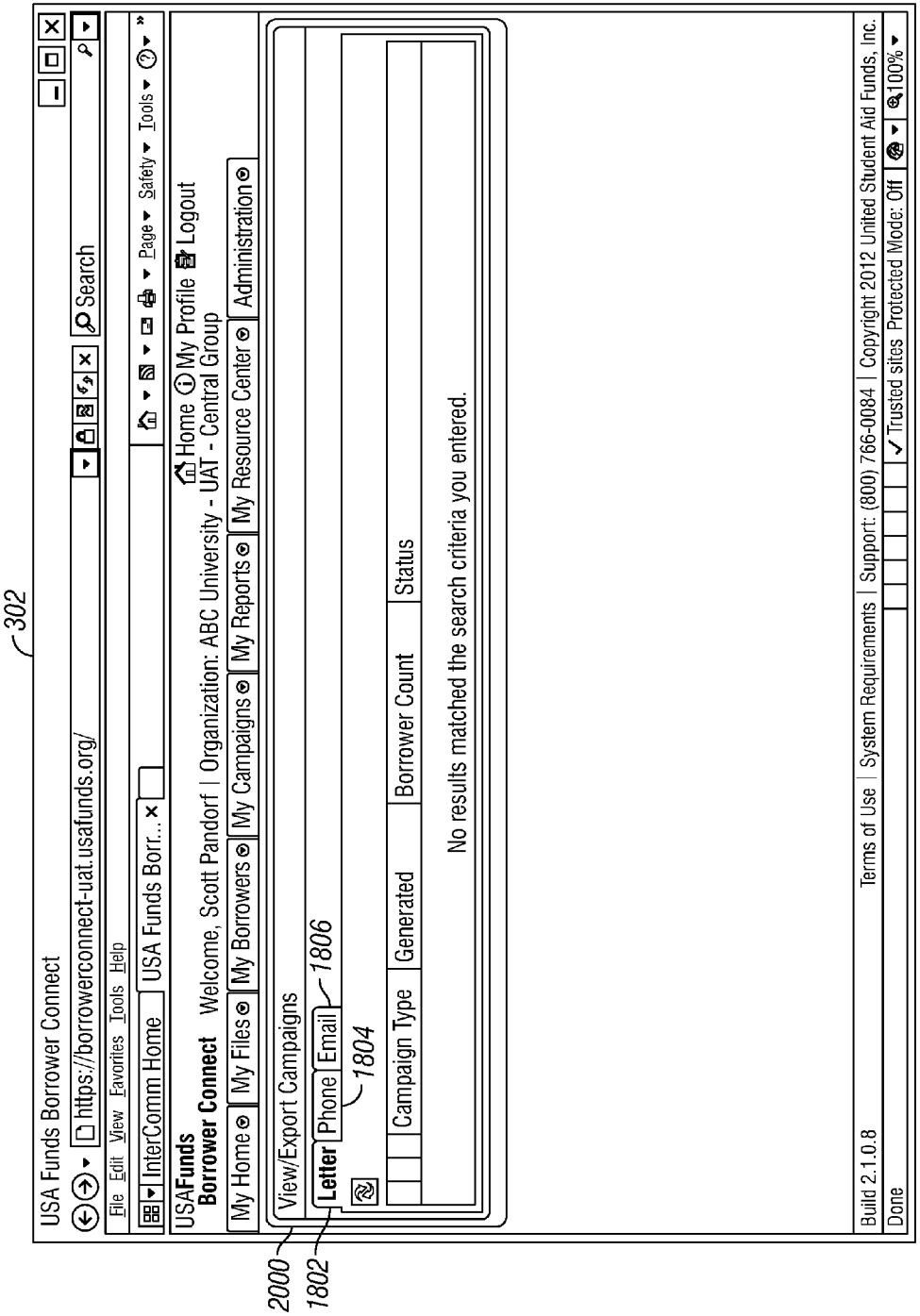
FIG. 20 shows a representative example of a view/export campaign page.

As illustrated in FIG. 20, selection of the view/export campaign application 444 generates a view/export campaign page 2000 in the web browser 302 on the remote terminal 106. The view/export campaign page 2000 allows the user 400 to print letters, download letters, and view phone call campaigns from FIG. 19. Once the generate campaigns selection item 1902 is selected, the generate campaigns application 442 is configured to automatically generate the correspondence that is associated with a given campaign. For example, in the case of a letter campaign, the generate campaigns application 442 will generate a plurality of letters addressed to borrowers who fall within the campaign type designated by the campaign. One or more files are generated that are accessible through the view/export campaign page 2000. In the case of email campaigns, only email campaigns that failed to send successfully will be displayed. Email campaigns complete in the Generate selection page 1900.

Figure 21:
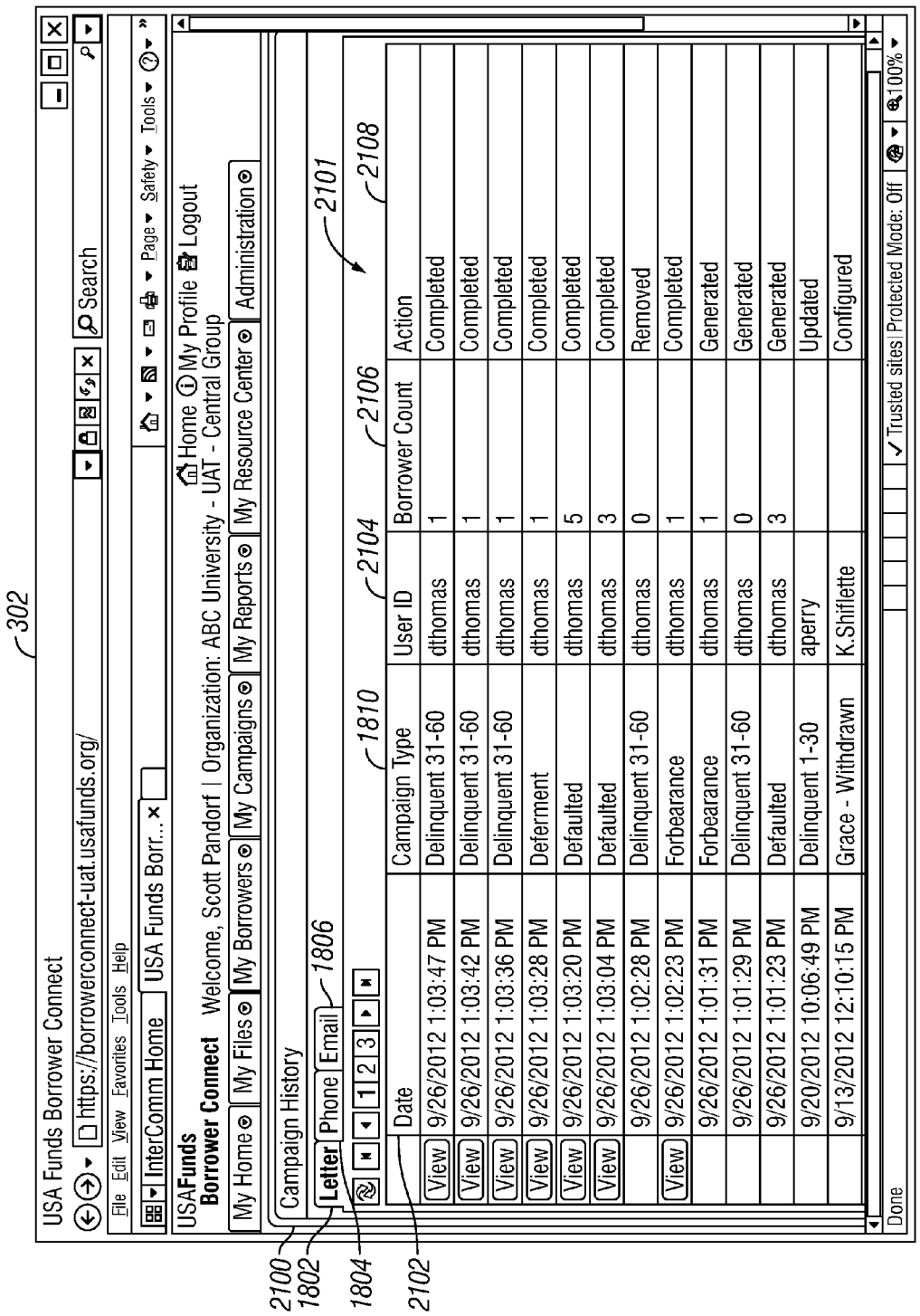
FIG. 21 shows a representative example of a campaign history page.

As illustrated in FIG. 21, selection of the campaign history application 446 generates a campaign history page 2100 in the web browser 302. As with the other campaign related pages, the campaign history page 2100 includes a Letter selection item 1802, a Phone selection item 1804, and an Email selection item 1806. As should be appreciated, selection by the user 400 of each of these selection items 1802-1806 causes the campaign history application 446 to generate a report detailing what types of campaigns have been conducted by the organization in the past as it relates to each of these categories. The campaign history page 2100 includes a history display area 2101 that displays various categories of historical data about each individual campaign.

As illustrated in FIG. 21, the history display area 2101 includes a Date category 2102, the Campaign Type category 1810, a User ID category 2104, a Borrower Count category 2106, and an Action category 2108. The Date category 2102 provides the date and time that the relevant campaign was completed. The Campaign Type category 1810 lists the type of campaign that was conducted or completed. The User ID category 2104 lists the user 400 that initiated and conducted the campaign. The Borrower Count category 2106 lists the number of borrowers that fell under or were contacted by the particular campaign. The Action category 2108 shows the status of a given campaign such as completed, removed, generated, configured, and so forth.

The campaign history page 2100 includes a View selection item 2110 next to each respective campaign. Selection of the View selection item 2110 causes the campaign history application 446 to display additional information about the respective campaign. For example, if a View selection item 2110 next to a respective letter campaign is selected, a pop-up window or page will be displayed that includes a copy of the letter. In addition, the user can look at all of the borrowers that were included in the campaign as a list of borrowers will also be displayed. All of the historical data relative to campaigns is stored in the database on the database server 128.

Figure 22:
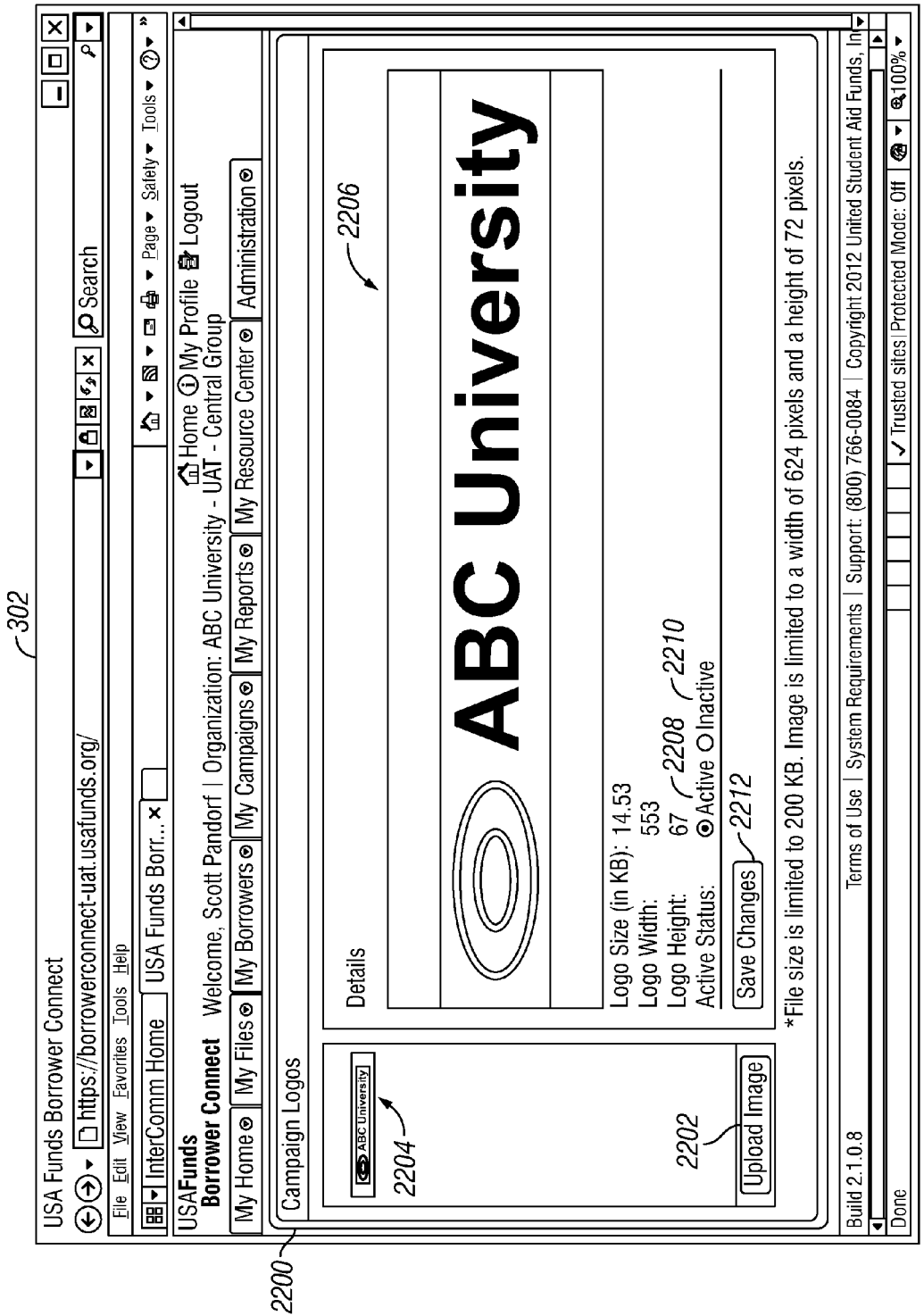
FIG. 22 shows a representative example of a campaign logos page.

As illustrated in FIG. 22, selection of the campaign logo application 448 generates a campaign logo page 2200 in the web browser 302. The campaign logo application 448 allows the user 400 to upload organization logos that can be applied to various letter and email campaigns during the campaign configuration process. An upload image selection item 2202 is included that allows the user 400 to upload logo files into the borrower connect application 210. The uploaded logos are displayed in a logo display area 2204 in the campaign logo page 2200. Selection of a logo in the logo display area 2204 brings the logo up in a display area 2206. An active selection item or radio button 2208 and an inactive selection item or radio button 2210 is included that allows the user 400 to designate the respective logo as either an activated or deactivated logo for use in connection with a respective campaign. A Save Changes selection item 2212 causes the selection made with respect to the active selection item 2208 or inactive selection item 2210 to be stored in the database on the database server 128.

Figure 23:
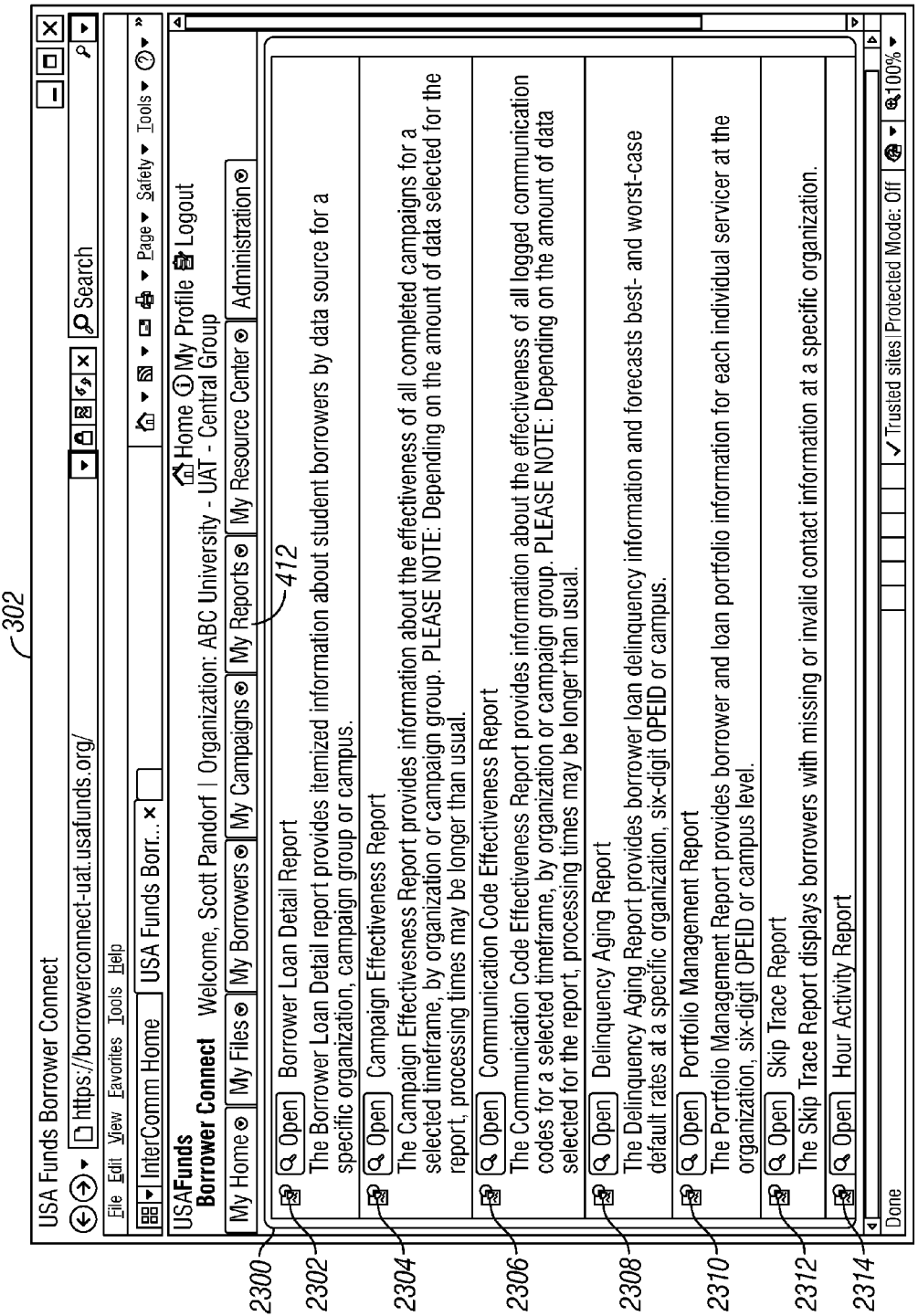
FIG. 23 shows a representative example of a my reports page.

As illustrated in FIG. 23, selection of the My Reports application 412 generates a My Reports page 2300 in the web browser 302. The My Reports page 2300 allows the user 400 to view various types of reports including a Borrower Loan Detail Report 2302, a Campaign Effectiveness Report 2304, a Communication Code Effectiveness Report 2306, a Delinquency Aging Report 2308, a Portfolio Management Report 2310, a User Activity Report 2314, and a User Effectiveness Report (not illustrated). Selection of each type of report causes the My Reports application 412 to generate and display the report.

The Borrower Loan Detail Report 2302 provides itemized information about student borrowers by data sources for a specific organization, campaign group or campus. The Campaign Effectiveness Report 2304 provides information about the effectiveness of all completed campaigns for a selected timeframe, by organization or campaign group. The Communication Code Effectiveness Report 2306 provides information about the effectiveness of all logged communication codes for a selected timeframe, by organization or campaign group. The Delinquency Aging Report 2308 provides borrower loan delinquency information and forecasts best and worst-case default rates at a specific organization, OPEID or campus. The Portfolio Management Report 2310 provides borrower and loan portfolio information for each individual servicer at the organization, OPEID or campus level. The Skip Trace Report 2312 displays borrowers with missing or invalid contact information at a specific organization. The User Activity Report 2314 provides information about each respective users activity within the borrower connect application 210 at a respective organization. The User Effectiveness Report 2316 provides information about the effectiveness of a user of the borrower connect application 210.

Figure 24:
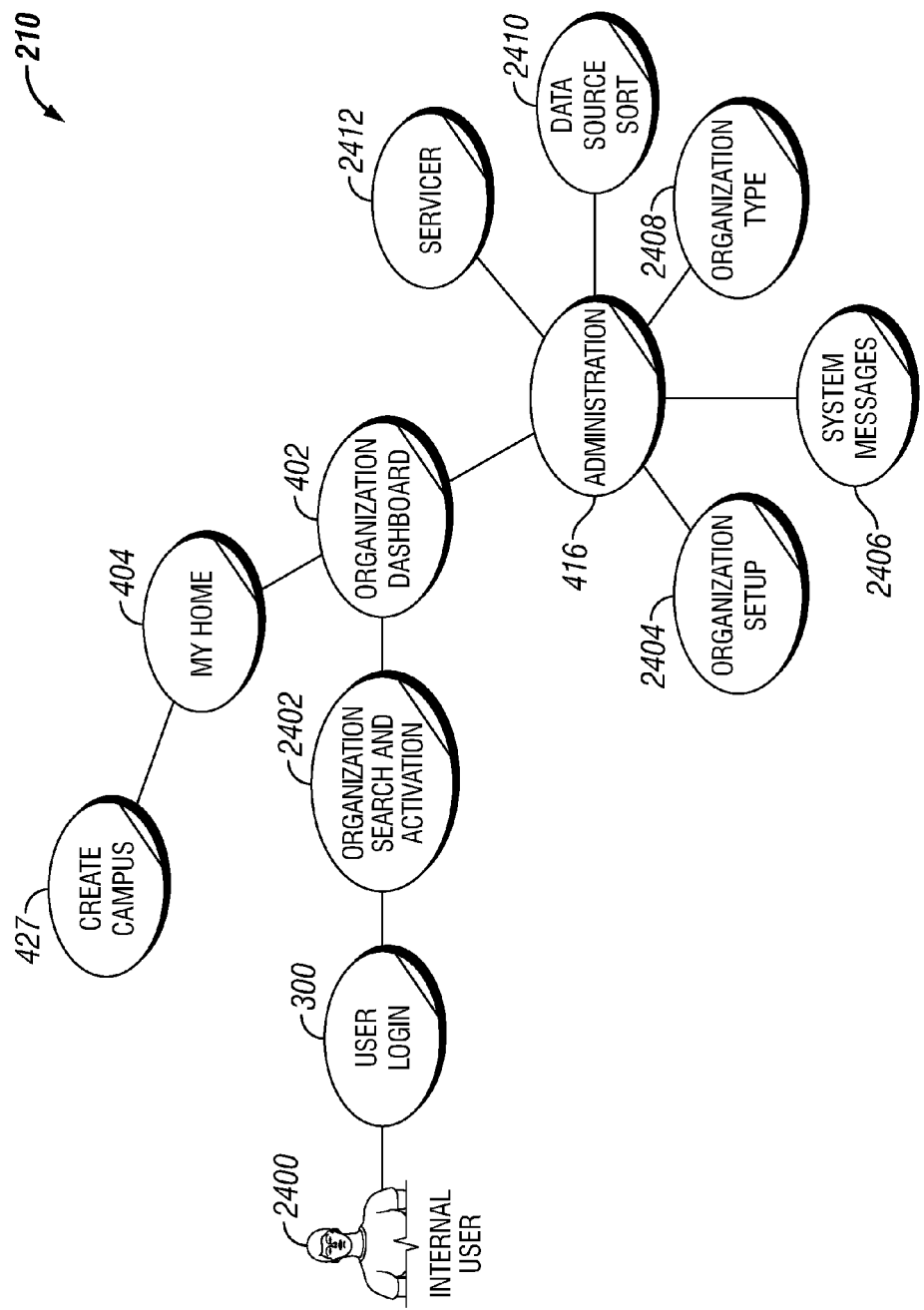
FIG. 24 discloses a flow chart of additional software applications available to internal users of the borrower connect system in addition to those set forth in FIG. 4.

Referring to FIG. 24, several additional representative software applications available to internal users 2400 of the borrower connect application 210 are illustrated. Internal users 2400 have access to all of the software applications set forth in FIG. 4 as well as those illustrated in FIG. 24. The user login application 300 is the same for both external users 400 and internal users 2400 and a discussion of this is not necessary. The borrower connect application 210 includes an organization search application 2402 that is presented to the internal user 2400 in an organization search page 2500, which is illustrated in FIG. 25. The organization search page 2500 includes a Name entry field 2502 and an Organization ID (OPEID) entry field 2504 that the internal user 2400 can use to search for relevant campuses. Once the relevant information is entered, selection of a Search selection item 2506 causes the organization search application 2402 to search the database on the database server 128 and the results are displayed in a search result area 2508 on the organization search page 2500. Once the internal user 2400 selects a respective campus in the search result area 2508, the borrower connect application 210 executes the organization dashboard application 402 for that respective campus and generates the organization dashboard page 500 for the internal user 2400.

Figure 26:
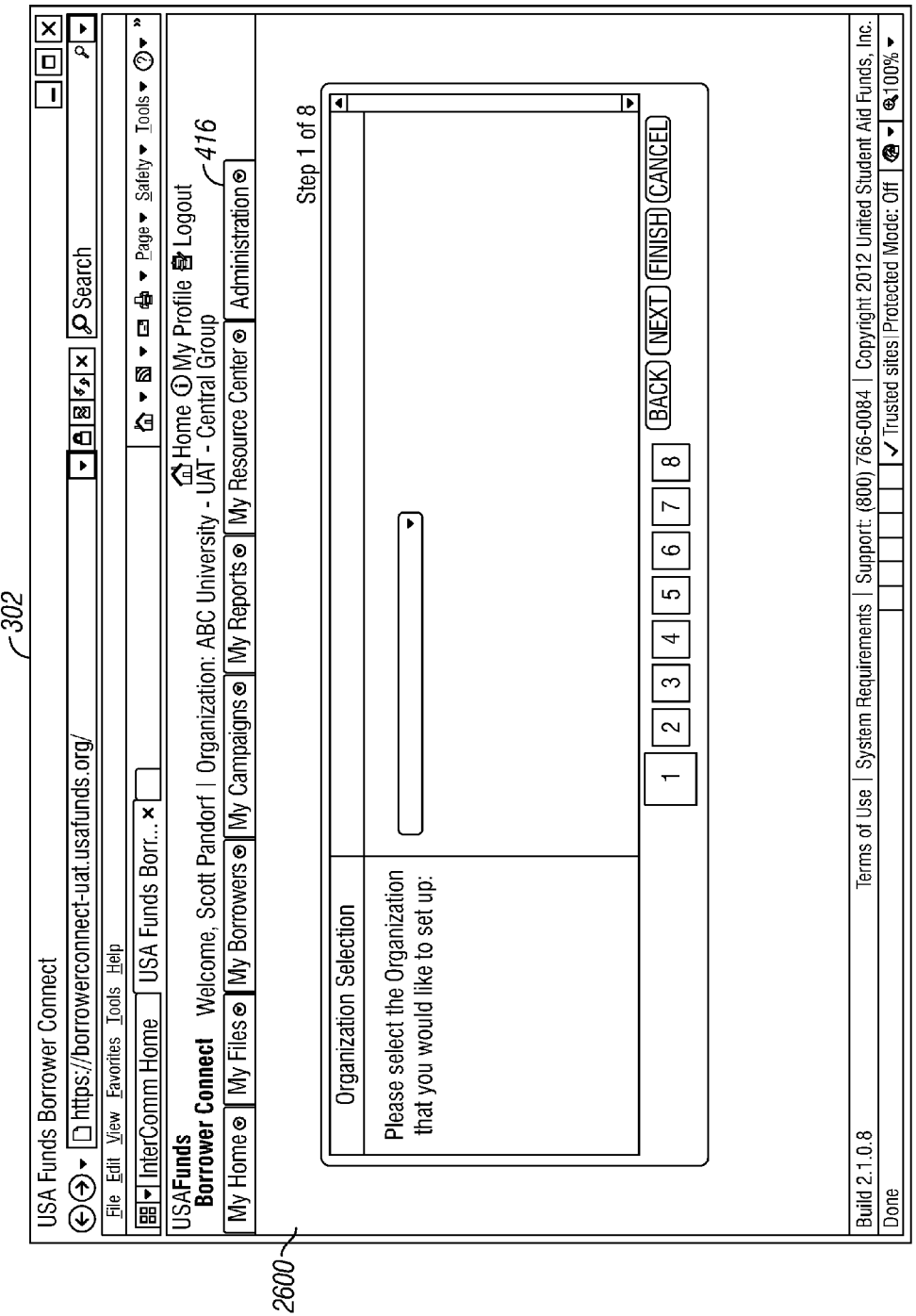
FIG. 26 shows a representative example of an organization setup page.

Referring to FIGS. 24 and 26, selection of the Administration application 416 brings up a menu of options available to the internal user 2400 to applications that can be accessed by the internal user 2400. These applications include an organization setup application 2404, a system messages application 2406, an organization type application 2408, a data source sort application 2410, and a servicer application 2412. Selection of the organization setup application 2404 generates an organization setup page 2600 in the web browser 302 on the remote terminal 106. The organization setup page 2600 allows the user to enter a new educational institution into the system 100. As illustrated, several steps need to be completed in order to create a new educational institution or client. Various information is entered into the organization setup page 2600 about the educational institution such as name, address, email address, contact information, and so forth. Once all of the relevant information is entered, the educational institution is created as a new user and all relevant information is stored in the database 122.

Figure 27:
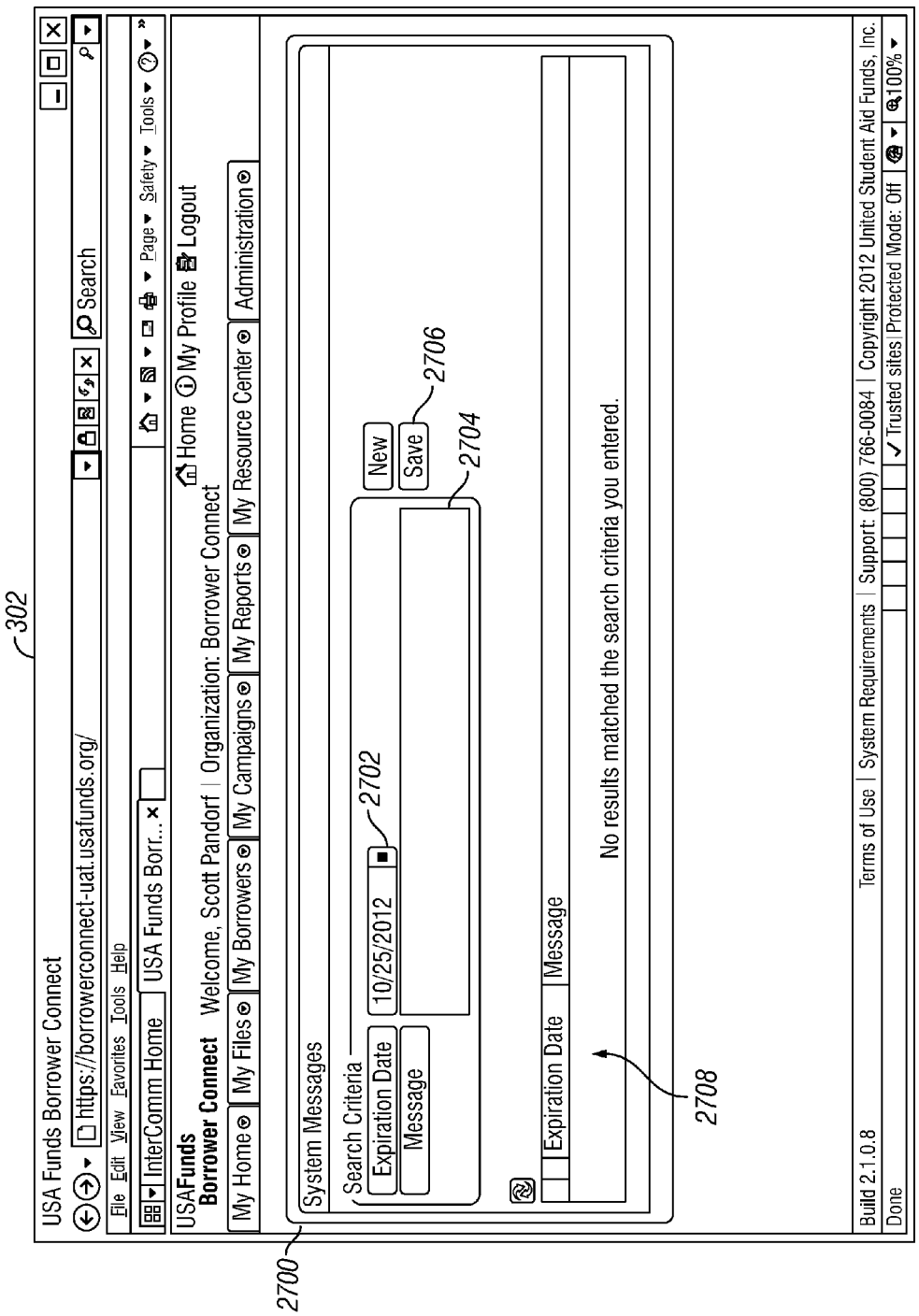
FIG. 27 shows a representative example of a system messages page.

Referring to FIG. 27, selection of the system messages application 2406 generates a system messages page 2700 in the web browser 302 on the remote terminal 106. The system messages page 2700 allows the internal user 2400 to generate system messages that can be viewed by all users of the system 100. The system messages page 2700 includes an expiration date entry field 2702, a message entry field 2704, a save selection item 2706, and a message display area 2708. The expiration date entry field 2702 allows the internal user 2400 to set the date upon which the message will expire or no longer be available for viewing. The message entry field 2704 allows the user to enter the message that needs to be sent. After the message is entered, selection of the save selection item 2706 causes the message to be posted or sent. All messages are stored in the database on the database server 128.

Figure 28:
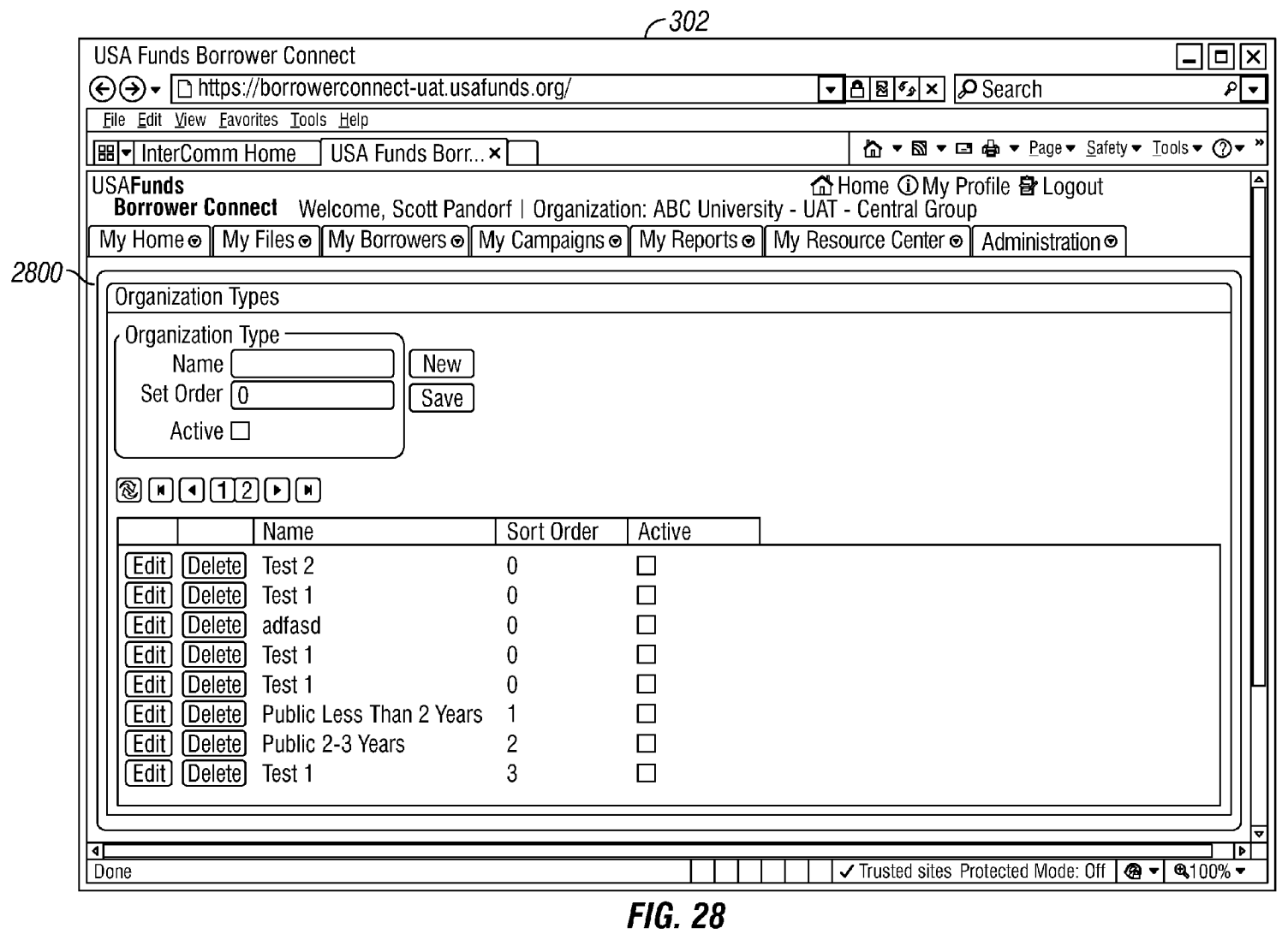

Referring to FIG. 28 selection of the organization type application 2408 generates an organization type page 2800 in the web browser 302. The organization type page 2800 allows the user to create different types of schools that are used during the setup process described with respect to FIG. 26. This could include, for example, the following type of information: proprietary 2-3 years, public less than 2 years, public 4+ years, private less than 2 years, private 2-3 years, private 4+ years, proprietary less than 2 years, proprietary 4+ years, foreign, unclassified, and closed.

Figure 29:
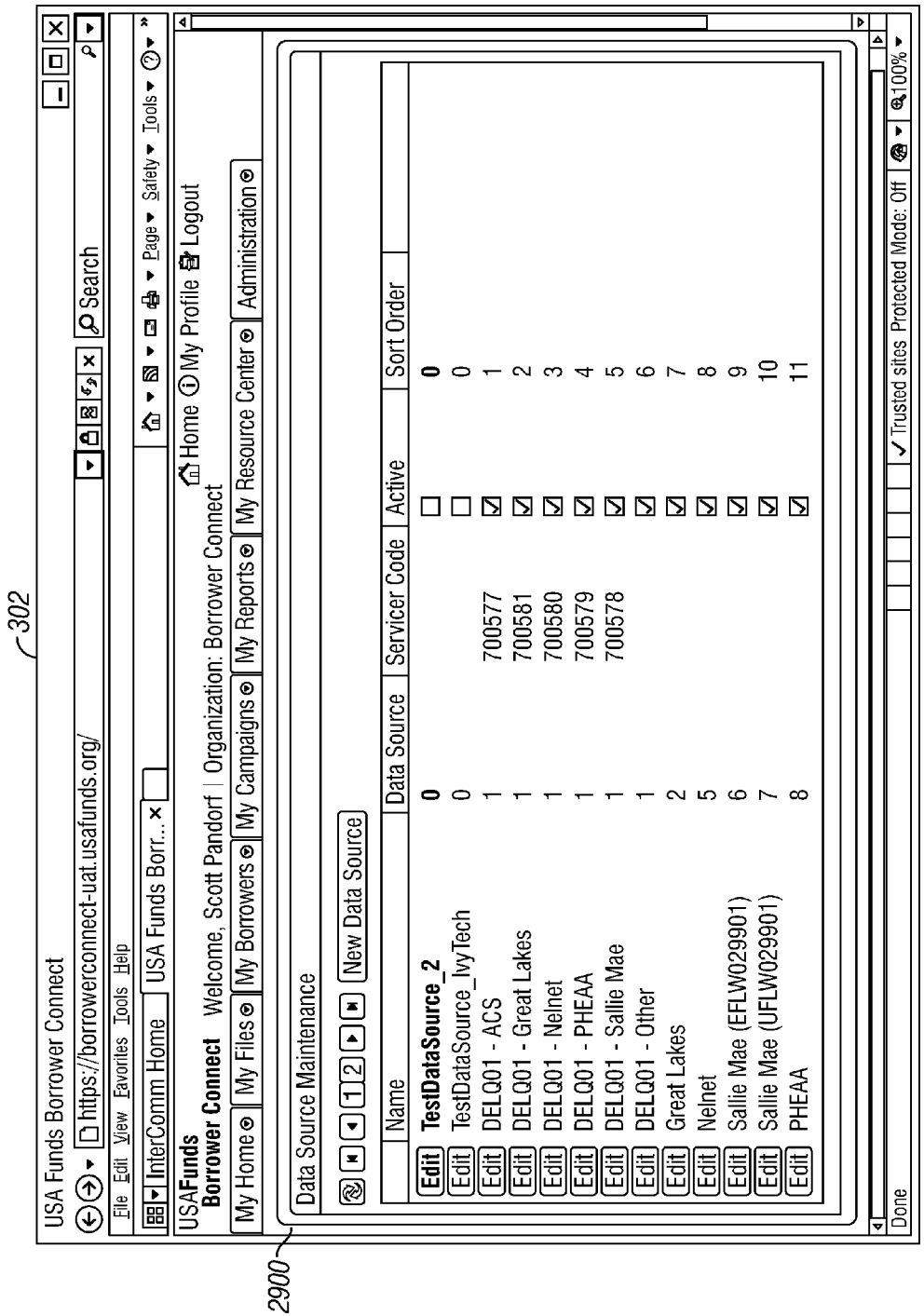
FIG. 29 shows a representative example of a data source sort page.
Figure 30:
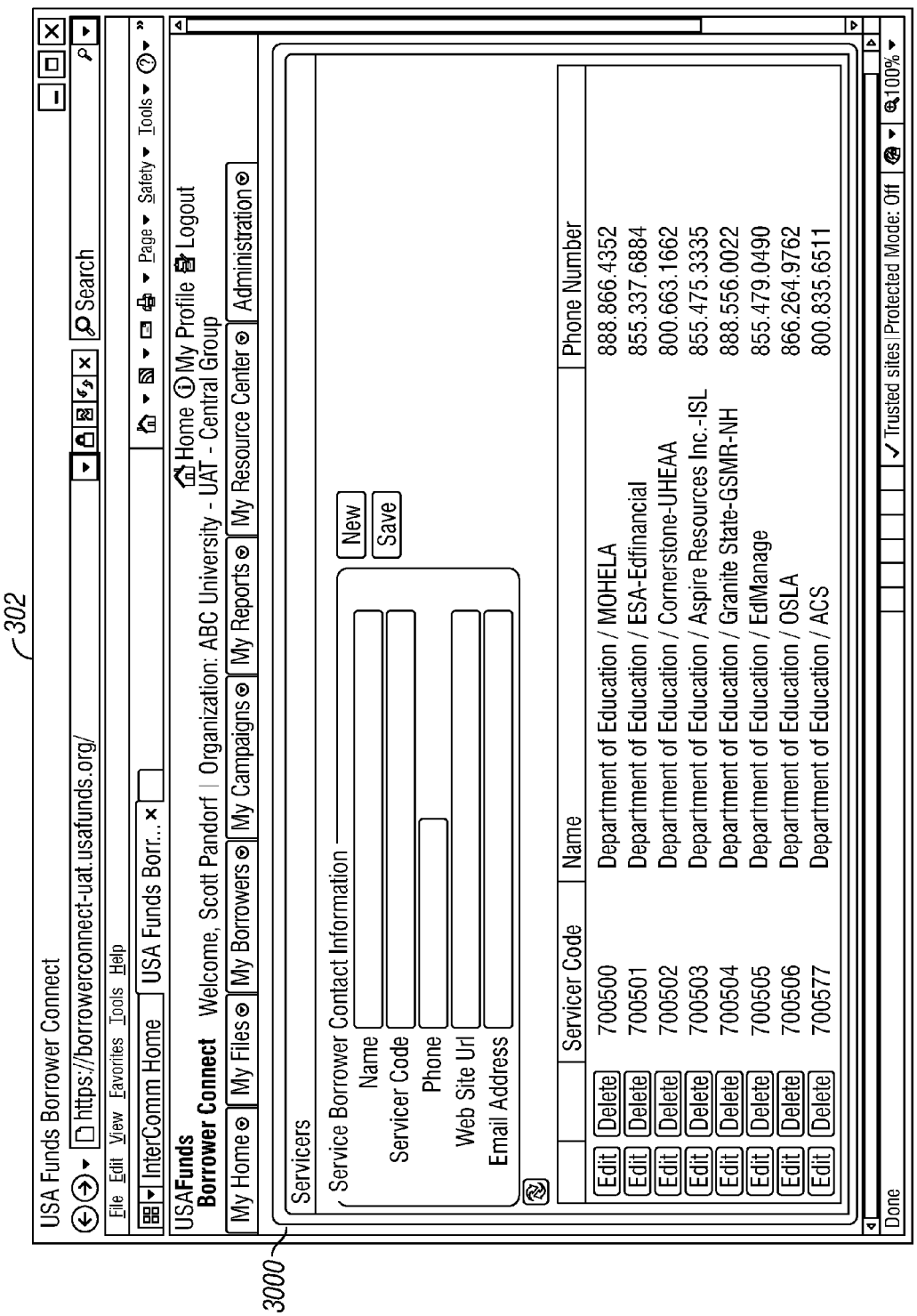
FIG. 30 shows a representative example of a servicer page.
Figure 31:
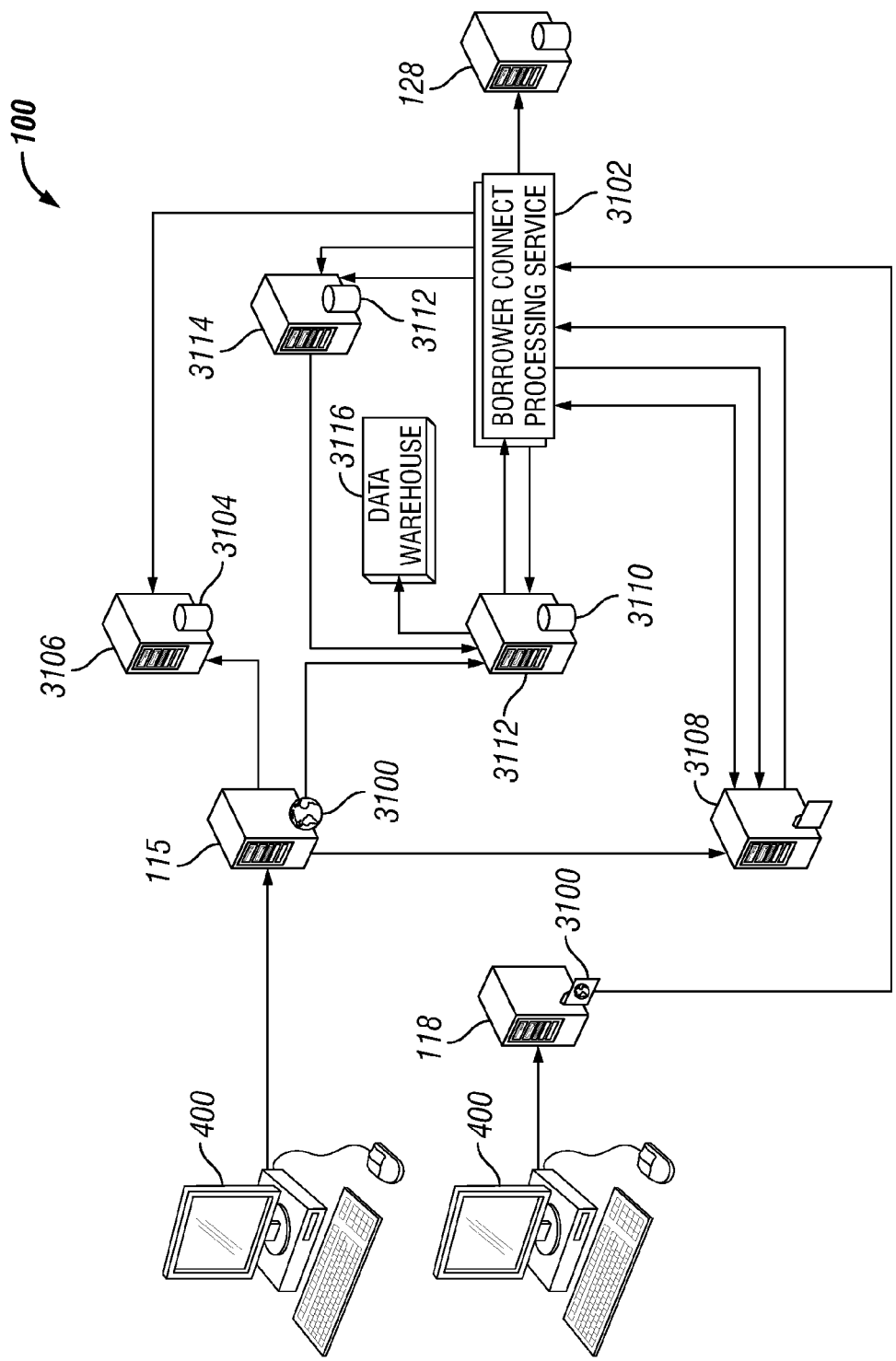
FIG. 31 illustrates a representative borrower connect system.

Referring to FIG. 29 selection of the data source sort application 2410 generates a data source sort page 2900 in the web browser 302. The data source sort page 2900 lists the loan service providers that have been entered into the system 100. In letter and email campaigns, the name, phone number, website address, and email address of loan service providers is given to the borrower so that the borrower knows how to contact the loan service provider. Selection of a New Data Source selection item 2902 or Edit selection item 2904 next to a service provider causes the data source sort application 2410 to generate the servicer page 3000. Referring to FIG. 30 selection of the servicer application 2412 generates a servicer page 3000 in the web browser 302. The servicer page 3000 allows the user to add a new loan service provider to the database 122 or edit information for an existing service provider. The servicer page 3000 includes a Name entry field 3002, a Servicer Code entry field 3004, a Phone number entry field 3006, a web site URL entry field 3008, and an email address entry field 3010. During setup or editing of a loan service provider, this information is entered into the respective entry fields and once complete, a Save selection item 3012 is selected and the loan service provider is stored in the database 122. As set forth above, in letter and email campaigns, all of the information about a loan service provider, except the servicer code, is provided to the borrower so that the borrower knows how to contact the loan service provider. This allows the borrower to have all of the information about all of his or her loan service providers in one document thereby eliminating the need for the borrower to search to locate contact information about a respective loan service provider. Referring to FIG. 31, the borrower connect system 100 includes a file import application 3100 that is used to import borrower data into the system 100. The file import process is divided into two components. These components are performed asynchronously to the user interface. A borrower connect processing service ("BCPS") application 3102 is installed on at least one server that de-queues tasks to perform and executes them. These tasks are divided up appropriately by organization into batches and scale out so many tasks for multiple organizations may be occurring simultaneously.

During the file import process, the file import application 3100 creates a file import log 3104 that is maintained on at least one server 3106. This may be the database server 128 illustrated in FIG. 1. It is important to realize that all of the software applications, databases, and files disclosed herein can be maintained on and executed by a single server, but in order for the system to scale more readily a plurality of servers are utilized in the preferred form. The file import log 3104 keeps track of the process identification, the file, the number of rows, errors, and descriptions, as applicable.

A file is uploaded or imported into the system 100 in one of two ways. As previously discussed, the file import application 3100 can generate a file import page 1600 in the web browser 302 that allows the user 400 to import files. See FIG. 16. Another way in which files may be imported into the system 100 is by using the FTP server 118. In this form, the organization uses FTP to transmit the files to the FTP server 118. Regardless of how the file is uploaded, the file is stored in a secure file path on a file server 3108. An import file record 3110 is created to manage the importation of the file. In the illustrated form, the import file record 3110 is created and stored on an administration server 3112. If the file is transmitted using FTP, the file is moved from the FTP server 118 to the file server 3108 and then the import file record 3110 is created.

Figure 32:
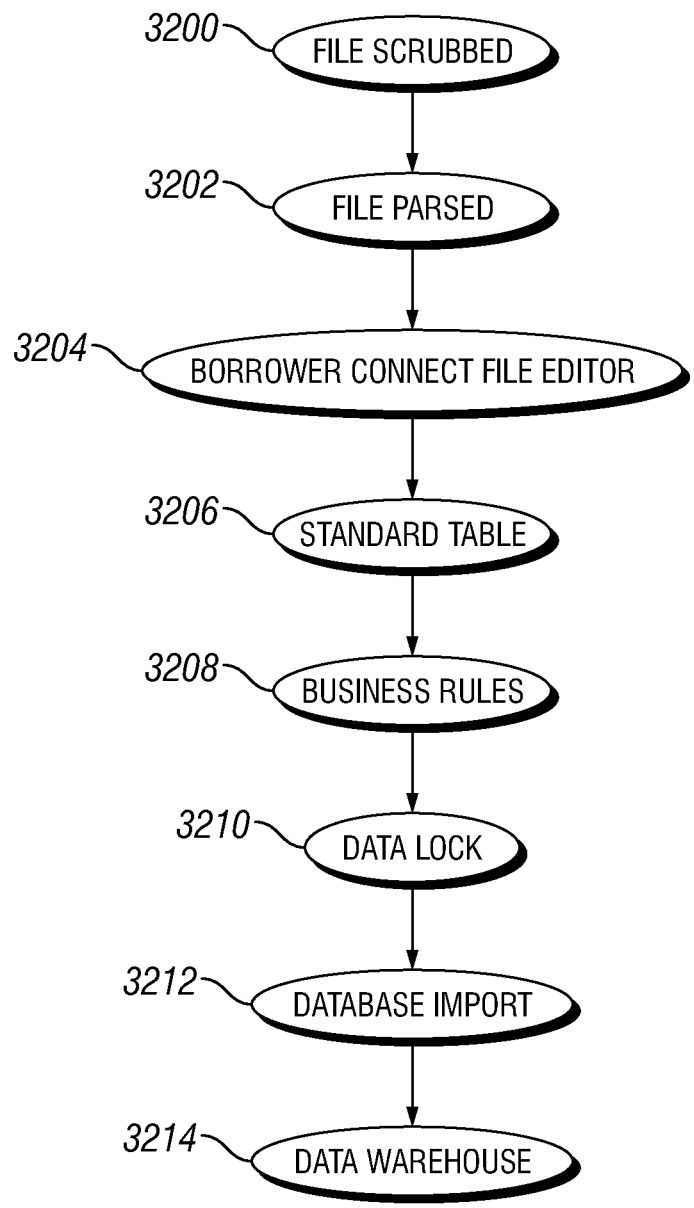
FIG. 32 is a flow chart of processes performed by the borrower connect processing services application.

After the file is imported, the BCPS application 3102 copies the file from the secure file location to a local path for processing and as such, the BCPS application 3102 acts as a data processing application. Referring to FIG. 32, a flow chart is illustrated that describes how the BCPS application 3102 includes several different applications to process each borrower loan data file. At step 3200, a scrubbing application is configured to remove invalid records from the file. Invalid records in the file include records that have a duplicate loan identifier, records that have an invalid OPEID, records in which the calculated cohort is outside the cohort range, and records in which the loan type is not imported. A backup of the original file is saved before the file is scrubbed.

After the file is scrubbed, at step 3202 a parsing application is configured to parse data in the file into fields based on row and column delimiters to form a plurality of parsed data. If a field is truncated during parsing, a notification is entered into the import log 3110 specifying the row number and field where truncating occurred. A borrower connect file editor application 3204 is configured to load the parsed data into a table 3112 on a data server 3114. The table 3112 is specifically created for the data file. At step 3206, a mapping application is configured to map the table 3112 to a standard table. In one form, the mapping application maps the data in batches and if an issue occurs while mapping, a status is flagged with a mapping error. At step 3208, a business rules application is configured to apply business rules to the incoming data from the standard table to match the data to existing data contained in the aggregated loan database record and determine whether or not it should be imported. These business rules include the following:

The OPEID field of the record is matched to a list of OPEID's assigned to an organization. This list is created from the OPEID's assigned to the campuses, and the OPEID assigned to the organization.
  If there is no match, the record is flagged as "do not import" and has its status set to "Invalid OPEID".
Cohort year field is checked. If the Cohort Year is missing, it is calculated based on the Date Entered Repayment. Any record outside the current cohort year is flagged as "do not import" and has its status set to "Outside Cohort Range".
Days Delinquent field is checked. If the Days Delinquent field is missing, it is calculated based on a Delinquency Date field. If the Delinquency Date is missing, nothing is calculated.
The Loan Status Effective Date field is checked. If the Loan Status Effective Date field is missing, it is set to be the "Import Date" of the file.
The Loan Status field is checked. If the Loan Status field is missing or was unable to be mapped, or is one of the Loan Statuses that is not being imported, the record is flagged as "do not import" and its status is set to "Loan Status or Loan Type not imported".

Validity flags are checked. If the validity flags are blank, good validity is assumed, and these are set to true.

Borrower Identifier field is matched to Borrower Identifier in the organization database.

If there is no match, it is a new borrower.

If the Borrower Identifier is blank, the record is flagged as "do not import"and has its status set to "Missing Borrower Identifier".

If the record being imported is a servicer record and does not match a National Student Loan Data System ("NSLDS") record, it is flagged as "Do Not Calculate". It is eligible for communications but should not be included in CDR calculations.

Current loans are archived that match the loans being imported by Organization/Data Source/OPEID/Borrower Social Security Number ("SSN").

Matched loans are un-archived when they are imported. Loans are matched by Organization/Data Source/Borrower/Loan Identifier.

Loan Identifier field is matched to Loan Identifier field in the organization database, along with Borrower UID and Data Source UID.

If there is no match, it is a new loan.

If the loan identifier is blank or missing, the record is flagged as "Do Not Warehouse", and will not be included in the reporting warehouse.

Borrower/campus relationships are identified. This lookup is done using the Borrower UID and the Campus UID, where the campus is matched using the OPEID. If the OPEID does not match any of the campuses, the Borrower is not associated with a campus and is not eligible for communications.

After the business rules are applied, at step 3210 a locking application is used to lock all borrower data records for import. No updating can be done at this point via the user interface and a message will appear indicating such if a user attempts to do so. At step 3212, an import application 3102 imports the data into the database associated with the organization. This data includes, but is not limited to, the following information:

Borrowers

Borrower Details

Borrower—Campus relationships

Loans

Primary contact information is updated, making sure the "do not contact"flags and rules are used appropriately.

Borrower unlocked.

Once all importing is done, row status reports are built and the temporary data is deleted from any temporary tables.

The import is flagged as complete.

At step 3214, data is periodically copied into a data warehouse 3116 to be used in creating the reports and dashboards disclosed herein.

Figure 33:
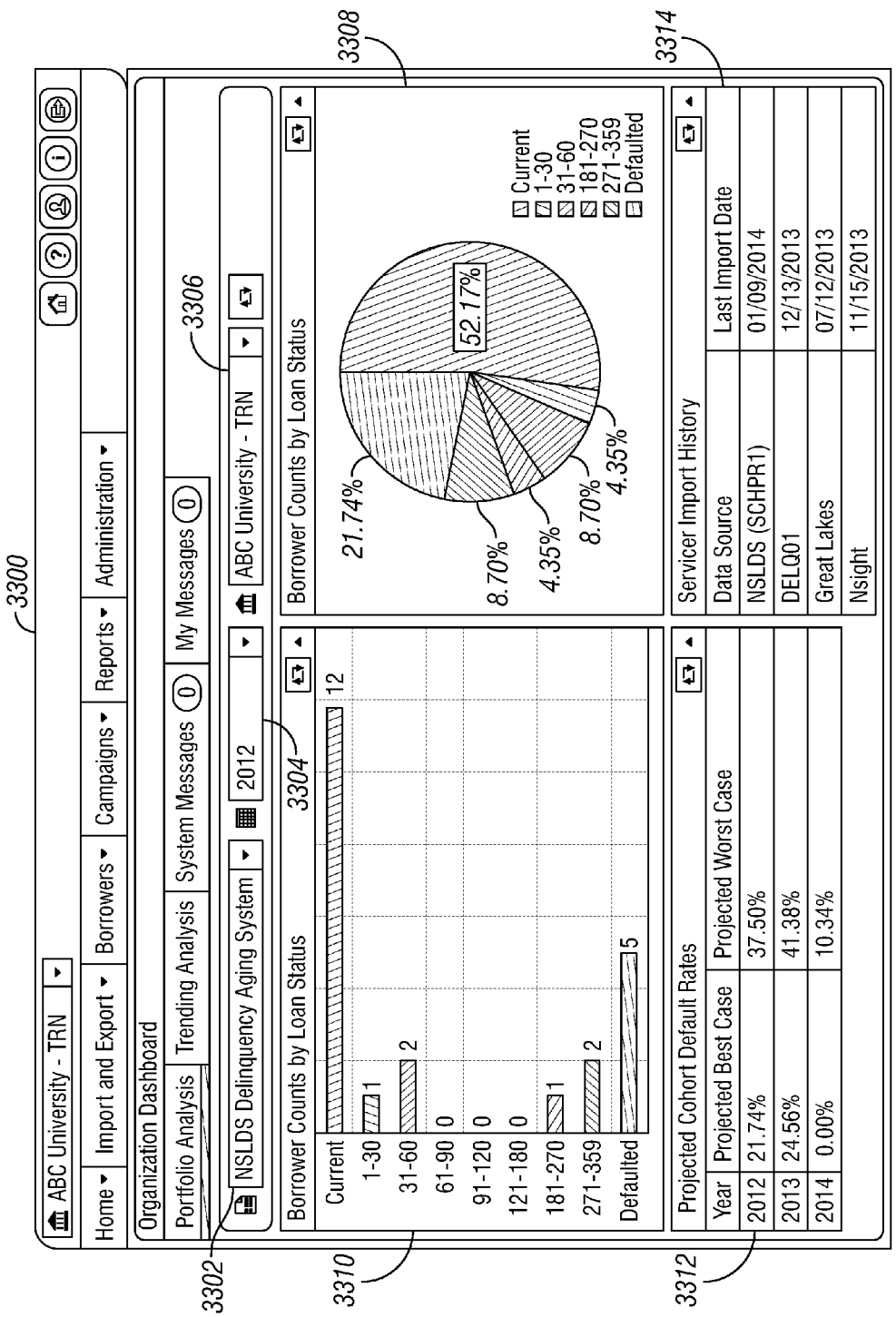
FIG. 33 shows a representative example of an organizational dashboard page.

Referring to FIG. 33, another representative organization dashboard page 3300 is illustrated that is generated by the organization dashboard application 402. In this form, the organization dashboard 3300 includes a data source selection item 3302, a cohort year selection item 3304, and a campus selection item 3306. The data source selection item 3302 allows the user to select a respective data source that is viewed in the organization dashboard page 3300. The data source selection item 3302 also includes an all servicers option that allows the user to view aggregated data from all data sources (NSLDS and individual third party servicers). As the user switches between data sources, the charts, graphs and tables discussed below are updated accordingly in the organization dashboard page 3300.

The cohort years selection item 3304 allows the user to select respective years for which he or she wants to view loan data in the organization dashboard page 3300. Selection of a respective year causes the data in the organization dashboard page 3300 to update accordingly. The campus selection item 3306 allows the user to view data associated with individual campuses or a combined view of all data associated with the entire educational institution.

The organization dashboard page 3300 includes a borrower counts by loan status chart 3308 and a borrower counts by loan status table or graph 3310. The borrower counts by loan status chart 3308 lists a percentage of borrowers in various states of repayment. In this chart 3308, the states of repayment include a current state, a 1-30 days delinquent state, a 31-60 days delinquent state, a 181-270 days delinquent state, a 271-359 days delinquent state, and a defaulted state. The borrower counts by loan status table 3310 lists a number of borrowers in various states of repayment. In this table 3310, the states of repayment include a current state, a 1-30 days delinquent state, a 31-60 days delinquent state, a 181-270 days delinquent state, a 271-359 days delinquent state, and a defaulted state. It should be appreciated that various ranges of days delinquent could be used in other charts and tables or graphs.

The organization dashboard page 3300 also includes a projected cohort default rates display 3312. In this form, the projected cohort default rates display 3314 provides the user with an estimate of the number of borrowers who will enter a defaulted state in the future. This estimate is created based on trends in the number of borrowers who are becoming delinquent in repayment. In the illustrated form, the projected cohort default rates display 3312 includes a year display and a projected best case scenario display and a projected worst case scenario display. The organization dashboard page 3300 also includes a servicer import history display 3314. The servicer import history display 3314 providers the user with a list of servicers for which data has been imported into the system 100 and the date of the last import associated with the servicer. This allows the user to know how current the data being displayed is with respect to a given servicer.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto.

What is claimed is:

1. A system, comprising:
   at least one server in communication with a remote terminal via an Internet based communication network, wherein said remote terminal is associated with an educational institution;
   a data import application associated with said server configured to generate a file import page on said remote terminal, wherein said file import page includes an add files selection item that is operable to allow an external user to designate a plurality of borrower loan data files obtained from a plurality of loan servicers that provide student loan servicing to students associated with said educational institution, wherein each of said plurality of borrower loan data files includes a plurality of loan records associated with one or more students of said educational institution, wherein said file import page includes an import files selection item that is operable to cause said data import application to upload said plurality of borrower loan data files from a storage medium associated with said remote terminal to a database associated with said server;

a data processing application associated with said server that is configured to aggregate said plurality of loan records contained in each of said plurality of borrower loan data files into an aggregated loan database record associated with said educational institution;

wherein said data processing application comprises:
  a scrubbing application configured to remove invalid data records from a plurality of data records contained in each borrower loan data file; and
  a locking application configured to lock all borrower records for import;

a configure campaign application associated with said server that is configured to generate a configure campaign page on said remote terminal, wherein said configure campaign page is operable to allow said user to create a plurality of campaigns directed to borrowers contained in said aggregated loan database record, wherein said plurality of campaigns include a letter campaign, a phone campaign, and an email campaign;

a generate campaign application associated with said server that is configured to generate a generate campaign page on said remote terminal, wherein said generate campaign page includes an active campaign list that includes said plurality of campaigns created with said configure campaign application, wherein said generate campaign page includes a generate selection item associated with each of said plurality of campaigns and upon selection of said generate selection item said generate campaign application implements said respective campaign, wherein details about said campaign implementation are stored in said database;

a campaign history application associated with said server configured to generate a campaign history page on said remote terminal, wherein said campaign history page includes a plurality of campaign data entries that allow said user to determine a campaign status associated with each of said plurality of campaigns, wherein said data entries comprise a list of campaigns, wherein each campaign in said list of campaigns includes a date in which said campaign was implemented, a campaign type, a user identification of who created said campaign, a borrower count displaying a number of borrowers in said campaign, and a status entry; and a find my borrowers application associated with said server configured to generate a find my borrowers page on said remote terminal, wherein said find my borrowers page includes one or more search criteria entry fields and a search selection item, wherein upon entry of data in said one or more search criteria entry fields and selection of said search selection item said find my borrowers application is configured to generate search results containing a list of one or more borrowers that match data entered in said one or more search criteria entry fields, wherein a view selection item is included next to each borrower contained in said list, wherein upon selection of said view selection item associated with a respective borrower said find my borrowers application is configured to generate a borrower details page on said remote terminal.

2. The system of claim 1, wherein a view selection item is associated with one or more campaigns in said list of campaigns, wherein selection of said view selection item allows said user to view said campaign.

3. The system of claim 1, wherein said campaign history page includes a selection tab configured to allow said user to toggle between views of historical data for letter campaigns, phone campaigns and email campaigns.

4. The system of claim 1, further comprising a find my borrowers application associated with said server that is configured to generate a find my borrowers page on said remote terminal, wherein said find my borrowers page includes a social security number search field, a last name search field, a first name search field, and a date of birth search field and a search selection item.

5. The system of claim 4, wherein upon entry of search criteria in one or more of said search fields and selection of said search selection item said find my borrowers application is configured to search said aggregated loan database record for one or more borrowers that satisfy said search criteria.

6. The system of claim 5, wherein said find my borrowers application is configured to generate a borrower display on said find my borrowers page that includes a borrower search result list containing borrowers that satisfy said search criteria.

7. The system of claim 6, wherein said borrower search result list includes a view selection item next to each borrower displayed in said borrower search result list, wherein selection of said view selection item next to a respective borrower causes said find my borrowers application to generate a borrower details page associated with said borrower on said remote terminal, wherein said find my borrowers application queries said aggregated loan database record to obtain data associated with said borrower.

8. The system of claim 7, wherein said borrow details page includes a primary contact information display, a phone and email information display field, a loan display field, and a communication history display field.

9. The system of claim 8, wherein said loan display field includes a loan type display field, an outstanding balance display field, a status display field, a cohort year display field, and a days delinquent display field.

10. The system of claim 8, wherein said loan display field contains a loan list containing loan data associated with one or more loans associated with said borrower, wherein a second view selection item is associated with each loan contained in said loan list, wherein upon selection of said second view selection item said find my borrowers application is configured to generate a loan summary display on said remote terminal containing detailed information about said loan.

11. The system of claim 8, wherein said communication history display field includes a communication history table detailing all communication with said borrower related to one or more campaigns.

12. The system of claim 11, wherein said communication history table includes a date display field, a communication code display field, a notes display field, and a user display field.

13. The system of claim 8, wherein said borrower details page includes a log communication selection item, wherein selection of said log communication selection item causes said find my borrowers application to display a record communication with borrower page, wherein said record communication with borrower page is configured to allow said user to enter data about various types of communication with said borrower that is then stored in said database.

14. A system, comprising:
- at least one server in communication with a remote terminal via an Internet based communication network, wherein said remote terminal is associated with an educational institution;
- a data import application associated with said server configured to generate a file import page on said remote terminal, wherein said file import page includes an add files selection item that is operable to allow an external user to designate a plurality of borrower loan data files obtained from a plurality of loan servicers that provide student loan servicing to students associated with said educational institution, wherein each of said plurality of borrower loan data files includes a plurality of loan records associated with one or more students of said educational institution, wherein said file import page includes an import files selection item that is operable to cause said data import application to upload said plurality of borrower loan data files from a storage medium associated with said remote terminal to a database associated with said server;
- a data processing application associated with said server that is configured to aggregate said plurality of loan records contained in each of said plurality of borrower loan data files into an aggregated loan database record associated with said educational institution, wherein said data processing application further includes a scrubbing application configured to remove invalid data records from a plurality of data records contained in each borrower loan data file;
- a configure campaign application associated with said server that is configured to generate a configure campaign page on said remote terminal, wherein said configure campaign page is operable to allow said user to create a plurality of campaigns directed to borrowers contained in said aggregated loan database record, wherein said plurality of campaigns include a letter campaign, a phone campaign, and an email campaign;
- a generate campaign application associated with said server that is configured to generate a generate campaign page on said remote terminal, wherein said generate campaign page includes an active campaign list that includes said plurality of campaigns created with said configure campaign application, wherein said generate campaign page includes a generate selection item associated with each of said plurality of campaigns and upon selection of said generate selection item said generate campaign application implements said respective campaign, wherein details about said campaign implementation are stored in said database, wherein said campaigns include an email campaign, a letter campaign, and a phone campaign;
- a campaign history application associated with said server configured to generate a campaign history page on said remote terminal, wherein said campaign history page includes a plurality of campaign data entries that allow said user to determine a campaign status associated with each of said plurality of campaigns, wherein said data entries comprise a list of campaigns, wherein each campaign in said list of campaigns includes a date in which said campaign was implemented, a campaign type, a user identification of who created said campaign, a borrower count displaying a number of borrowers in said campaign, and a status entry; and
- a find my borrowers application associated with said server configured to generate a find my borrowers page on said remote terminal, wherein said find my borrowers page includes one or more search criteria entry fields and a search selection item, wherein upon entry of data in said one or more search criteria entry fields and selection of said search selection item said find my borrowers application is configured to generate search results containing a list of one or more borrowers that match data entered in said one or more search criteria entry fields, wherein a view selection item is included next to each borrower contained in said list, wherein upon selection of said view selection item associated with a respective borrower said find my borrowers application is configured to generate a borrower details page on said remote terminal.

15. The system of claim 14, wherein said borrower details page includes a primary contact information display field, a phone and email information display field, a loan summary display field, and a communication history display field.

16. The system of claim 15, wherein said loan summary display field includes a table that displays information related to one or more loans associated with said borrower, wherein said table displays a loan type, an outstanding balance, a loan status, a days delinquent, and an updated date associated with each of said one or more loans.

17. The system of claim 16, wherein a second view selection item is associated with each loan in said table, wherein selection of said second view selection item causes said find my borrowers application to generate a loan summary page associated with said selected loan, wherein said find my borrowers application queries said aggregated loan database record to obtain data related to said loan.

18. The system of claim 15, wherein said communication history display field includes a table containing data related to each communication between said borrower and said educational institution concerning one or more loans.

* * * * *